United States Patent
Krasilnikov et al.

(10) Patent No.: US 11,937,103 B1
(45) Date of Patent: Mar. 19, 2024

(54) ENHANCING AVAILABILITY OF RADIO-BASED APPLICATIONS USING MULTIPLE COMPUTE INSTANCES AND VIRTUALIZED NETWORK FUNCTION ACCELERATORS AT CLOUD EDGE LOCATIONS

(71) Applicant: Amazon Technologies, Inc., Seattle, WA (US)

(72) Inventors: Nikolay Krasilnikov, Seattle, WA (US); Theodore Joseph Maka'iwi DeRego, Shoreline, WA (US); Yuan-An Liu, Pleasanton, CA (US); Benjamin Wojtowicz, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/820,542

(22) Filed: Aug. 17, 2022

(51) Int. Cl.
*H04W 24/02* (2009.01)
*G06F 9/455* (2018.01)
*H04L 41/0895* (2022.01)

(52) U.S. Cl.
CPC ........ *H04W 24/02* (2013.01); *G06F 9/45558* (2013.01); *H04L 41/0895* (2022.05); *G06F 2009/4557* (2013.01); *G06F 2009/45595* (2013.01)

(58) Field of Classification Search
CPC .............. H04W 24/02; G06F 9/45558; G06F 2009/4557; G06F 2009/45595; H04L 41/0895
See application file for complete search history.

(56) References Cited

U.S. PATENT DOCUMENTS

| | | | |
|---|---|---|---|
| 8,539,079 | B2 | 9/2013 | Thireault |
| 9,125,047 | B2 | 9/2015 | Sundaresan et al. |
| 9,703,660 | B2 | 7/2017 | Cillis et al. |
| 9,838,268 | B1 | 12/2017 | Mattson |
| 9,876,851 | B2 | 1/2018 | Chandramouli et al. |
| 10,064,242 | B2 | 8/2018 | Pawar et al. |
| 10,135,702 | B2 | 11/2018 | Lahiri |
| 10,244,507 | B2 | 3/2019 | Tarlazzi et al. |

(Continued)

OTHER PUBLICATIONS

Doan, Tung V., et al. "FAST: Flexible and low-latency state transfer in mobile edge computing." IEEE Access 9 (Year: 2021).*

(Continued)

*Primary Examiner* — John M MacIlwinen
(74) *Attorney, Agent, or Firm* — Robert C. Kowert; Kowert, Hood, Munyon, Rankin & Goetzel, P.C.

(57) ABSTRACT

State information of a radio-based application, used to process messages of the application, is made accessible from a first compute instance and a second compute instance at a virtualization server. The first instance is assigned to process a first portion of a workload of the application, including a message which comprises a result of a network function executed at a network function accelerator of the server. In response to determining that a condition for migrating workload from the first compute instance has been met, an additional message of the first portion is directed to the second compute instance. The second compute instance processes the additional message using the state information.

20 Claims, 13 Drawing Sheets

(56) References Cited

U.S. PATENT DOCUMENTS

| | | | |
|---|---|---|---|
| 10,257,105 | B2 | 4/2019 | Majmundar et al. |
| 10,419,550 | B2 | 9/2019 | Nainar et al. |
| 10,581,717 | B2 | 3/2020 | Tejaprakash et al. |
| 10,594,456 | B2 | 3/2020 | Park et al. |
| 10,608,734 | B2 | 3/2020 | Barbieri et al. |
| 10,705,808 | B2 | 7/2020 | Chiosi et al. |
| 10,749,721 | B2 | 8/2020 | Fertonani et al. |
| 10,750,514 | B2 | 8/2020 | Fujinami |
| 10,817,409 | B2 | 10/2020 | Zeng et al. |
| 10,880,173 | B2 | 12/2020 | Seenappa et al. |
| 10,944,668 | B2 | 3/2021 | Rajagopal |
| 10,959,098 | B2 | 3/2021 | Cidon et al. |
| 10,999,783 | B2 | 5/2021 | Pateromichelakis |
| 11,190,413 | B1 | 11/2021 | Priya et al. |
| 11,356,500 | B1 * | 6/2022 | Gupta ................ H04L 67/1001 |
| 11,539,582 | B1 | 12/2022 | Gupta et al. |
| 11,552,842 | B2 | 1/2023 | Barabell |
| 2012/0127151 | A1 | 5/2012 | Murakami |
| 2018/0146375 | A1 | 5/2018 | Pawar et al. |
| 2018/0365635 | A1 | 12/2018 | Lucrecio et al. |
| 2019/0042326 | A1 | 2/2019 | Chilikin |
| 2019/0158606 | A1 * | 5/2019 | Guim Bernat ........ H04W 40/20 |
| 2019/0165906 | A1 | 5/2019 | Bala et al. |
| 2019/0190785 | A1 | 6/2019 | Power |
| 2019/0213029 | A1 | 7/2019 | Liu et al. |
| 2019/0394826 | A1 | 7/2019 | Wang et al. |
| 2019/0289497 | A1 | 9/2019 | Rajagopal |
| 2019/0391855 | A1 | 12/2019 | Bernat et al. |
| 2020/0142735 | A1 | 5/2020 | Maciocco |
| 2020/0245229 | A1 | 7/2020 | Horn et al. |
| 2021/0006944 | A1 | 1/2021 | Raghothaman et al. |
| 2021/0073047 | A1 | 3/2021 | Bhandaru |
| 2021/0144517 | A1 | 5/2021 | Guim Bernat et al. |
| 2021/0144555 | A1 | 5/2021 | Kim et al. |
| 2021/0243770 | A1 | 8/2021 | Roessler |
| 2021/0271517 | A1 | 9/2021 | Guim Bernat |
| 2022/0030117 | A1 | 1/2022 | Young et al. |
| 2022/0046084 | A1 | 2/2022 | Nair |
| 2022/0070734 | A1 | 3/2022 | Rajagopal |
| 2022/0377615 | A1 | 11/2022 | Radunovic |

OTHER PUBLICATIONS

Prados-Garzon, Jonathan, et al. "Handover implementation in a 5G SDN-based mobile network architecture." 2016 IEEE 27th Annual International Symposium on Personal, Indoor, and Mobile Radio Communications (PIMRC). IEEE. (Year: 2016).*

Ramanathan, Shunmugapriya, et al. "Demonstration of containerized central unit live migration in 5g radio access network." 2022 IEEE 8th International Conference on Network Softwarization (NetSoft). IEEE. (Year: 2022).*

Ashfaq Ahmed, et al., "Hybrid Automatic Repeat Request (HARQ) in Wireless Communication Systems and Standards: A Contemporary Survey", IEEE Communications Surveys & Tutorials 23.4, 2021, pp. 2711-2752.

Unknown, "5G; NG-RAN; Architecture Description", Technical Specification, ETSI TS 138 401, Version 16.8.0, Release 16, Jan. 2022, pp. 1-82.

U.S. Appl. No. 17/808,518, filed Jun. 23, 2022, Ozgur Dural.
U.S. Appl. No. 17/548,391, filed Dec. 10, 2021, Ammar Latif.
U.S. Appl. No. 17/364,791, filed Jun. 30, 2021, Diwakar Gupta.
U.S. Appl. No. 17/364,788, filed Jun. 30, 2021, Diwakar Gupta.
U.S. Appl. No. 17/364,779, filed Jun. 30, 2021, Diwakar Gupta.
U.S. Appl. No. 17/326,218, filed May 20, 2021, Ximeng Simon Yang.
U.S. Appl. No. 17/326,221, filed May 20, 2021, Ximeng Simon Yang.
U.S. Appl. No. 17/461,785, filed Aug. 30, 2021, Diwakar Gupta.
U.S. Appl. No. 17/806,684, filed Jun. 13, 2022, Benjamin Wojtowicz.
U.S. Appl. No. 17/806,685, filed Jun. 13, 2022, Benjamin Wojtowicz.
U.S. Appl. No. 17/807,343, filed Jun. 16, 2022, Upendra Bhalchandra Shevade et al.
U.S. Appl. No. 17/807,344, filed Jun. 16, 2022, Upendra Bhalchandra Shevade et al.
U.S. Appl. No. 17/807,341, filed Jun. 16, 2022, Upendra Bhalchandra Shevade et al.
U.S. Appl. No. 17/809,864, filed Jun. 29, 2022, Nikolay Krasilnikov, et al.
U.S. Appl. No. 18/146,126, filed Dec. 23, 2022, Diwakar Gupta.
U.S. Appl. No. 18/067,651, filed Dec. 16, 2022, Frank Paterra.
U.S. Appl. No. 18/067,650, filed Dec. 16, 2022, Jiandong Huang.
U.S. Appl. No. 18/066,943, filed Dec. 15, 2022, Awaiz Ahmad Khan.
U.S. Appl. No. 18/067,654, filed Dec. 16, 2022, Frank Paterra.
U.S. Appl. No. 17/810,319, filed Jun. 30, 2022, Julius Mueller, et al.
U.S. Appl. No. 17/710,571, filed Mar. 31, 2022, Manjari Asawa.

* cited by examiner

ENHANCING AVAILABILITY OF RADIO-BASED APPLICATIONS USING MULTIPLE COMPUTE INSTANCES AND VIRTUALIZED NETWORK FUNCTION ACCELERATORS AT CLOUD EDGE LOCATIONS

BACKGROUND

Several generations of broadband cellular communication technologies have been deployed in recent years. 5G is the fifth-generation technology standard for broadband cellular networks, which is gradually taking the place of the fourth-generation (4G) standard of Long-Term Evolution (LTE). 5G technology offers greatly increased bandwidth, thereby broadening the cellular market beyond smartphones to provide last-mile connectivity to desktops, set-top boxes, laptops, Internet of Things (IoT) devices, and so on. Some 5G cells employ frequency spectrum similar to that of 4G, while other 5G cells may employ frequency spectrum in the millimeter wave band. Cells in the millimeter wave band may have a relatively small coverage area but may offer much higher throughput than 4G. As 5G technology becomes more prevalent, new types of broadband-based applications are likely to be developed and deployed.

Figure 1:
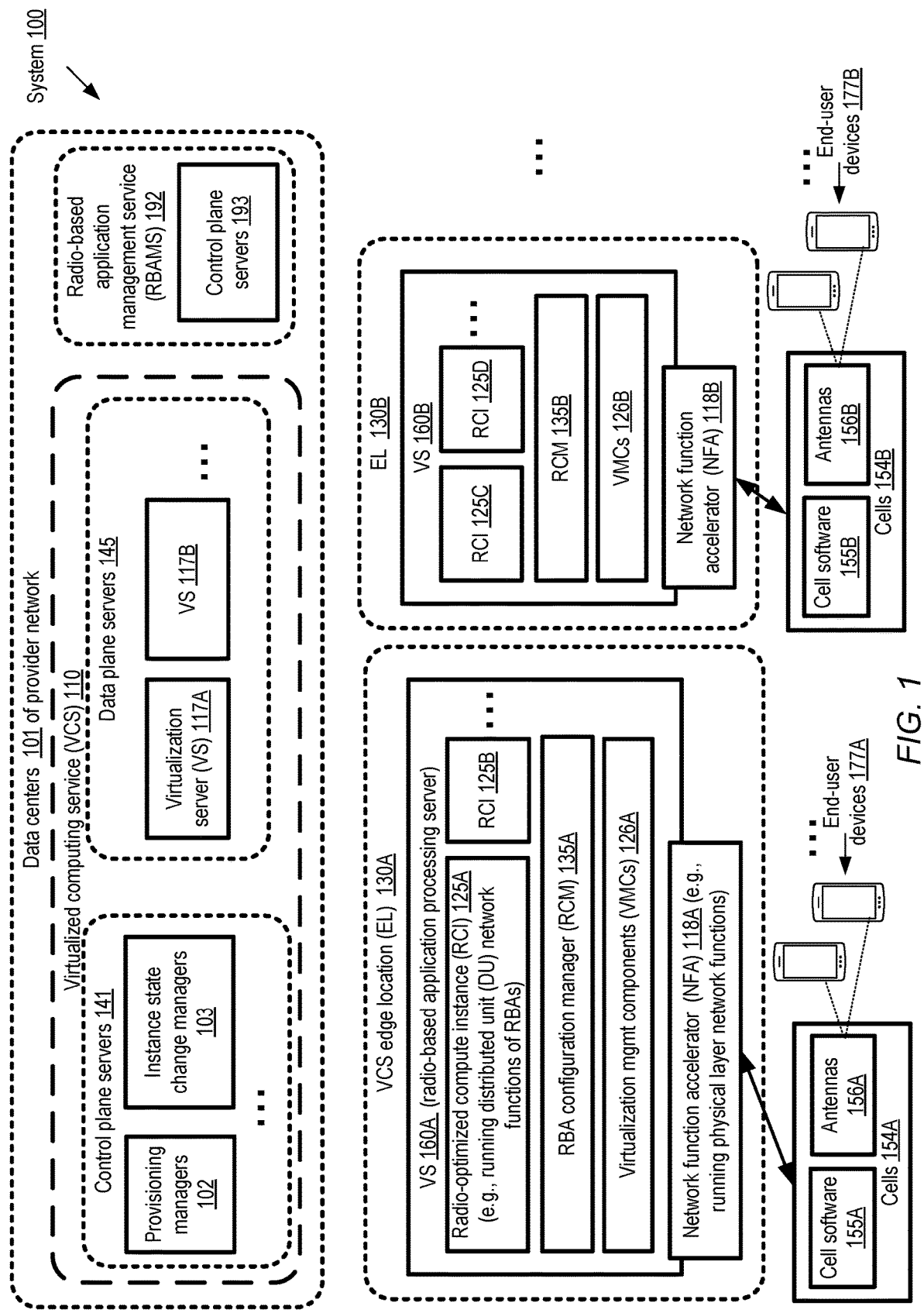
FIG. 1 illustrates an example system environment in which the availability of distributed units (DUs) of radio-based applications, implemented at edge locations of a cloud provider network, may be enhanced with the help of virtualized representations of network function accelerators and replication of application state information, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the term "set" should generally be interpreted to include one or more described items throughout this application. Accordingly, phrases such as "a set of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for enhancing the availability and resilience of distributed units (DUs) and other components of radio-based applications that are implemented at edge locations of cloud provider networks, using multiple compute instances that have access to shared network function accelerators and to replicated state information of the radio-based applications. Deployments to the edge of 5G networks can create an availability challenge. Often, a single DU is responsible for all connectivity at particular location, so there is no redundancy that would allow downtime of the DU (e.g., for software updates) without taking a hit to availability. At the same time, avoiding downtime can be critical for use cases like emergency services. The present disclosure solves this availability challenge, among other challenges, by using a virtualized accelerator and virtualized compute instances for the DU, to avoid downtime even with a single DU at the location.

In order to support the kinds of low message latencies needed for various types of radio-based applications (RBAs, such as public or private fifth-generation (5G) applications), some DU network functions of the applications can be run at edge locations of a cloud provider network; such edge locations may be closer to antennas, cell towers and other types of widely dispersed equipment used for radio-based applications than the primary data centers of the cloud provider network. RBAs are typically set up as cellular applications, whose overall service area is divided into small geographic areas called cells. User equipment devices (such as mobile phones) which happen to be located currently in a given cell can communicate by radio waves with other components of the RBAs via fixed antennas located within the area of the cell. If and when a user equipment device is moved from one location to another, antennas in a different cell of the RBAs can be used for that device if needed. The DU network functions, which can include layer 2 (L2) network functions of radio-based technology stacks, can be executed using the primary processors (e.g., CPUs) of virtualization servers that are equipped with hardware network function accelerators (NFAs), with the NFAs being used for at least some layer 1 (L1) or physical layer network functions of the radio-based technology stacks. At a given virtualization server, several radio-optimized compute instances (RCIs) or virtual machines can be launched for running programs implementing DU network functions, with state information of a radio-based application (RBA) being replicated among the compute instances in such a way that any one of the compute instances can very quickly take over the processing of any given portion of the overall DU workload. Each RCI can be provided access to a respective virtualized representation of an NFA at which L1 network functions of the RBA are run.

Initially, the overall DU workload of a virtualization server can be distributed among the different RCIs by a local RBA configuration manager (RCM) of the virtualization server, for example with each RCI being assigned responsibility for processing user plane RBA traffic associated with one or more cells. Control plane servers of the cloud provider network, to whom RBA application owners provide descriptors of their RBAs, can forward information about desired/expected RBA workloads to RCMs at various edge locations, and the RCMs can then take the configuration steps necessary to support and distribute the workloads among the RCIs.

An RCM can also cause RBA state information, which may be obtained for example via control plane messages received from centralized units (CUs) of the RBA, to be made accessible to, or replicated at, each of the RCIs. In some cases the NFA can comprise multiple sub-units (e.g., processing cores), and the overall L1 workload can be distributed among the sub-units. The RCM can maintain and propagate a mapping between respective portions of the RBA workload at the L1 layer (executed at the NFA) and the workload at the DU or L2 layer (executed at the RCIs). Using such mappings, the appropriate RCI can be chosen as the destination for an RBA user plane message or packet from the NFA, and the appropriate NFA sub-unit can be chosen as the destination for an RBA user plane message or packet from an RCI. Respective virtualized representations of the NFA can be used for accessing messages from the NFA at each of the RCIs.

In response to detecting certain kinds of triggering conditions or criteria, the RCM can migrate or transfer responsibility for a given portion of the DU workload (e.g., by modifying a mapping of the kind indicated above) from one RCI to another. For example, if a new version of DU software is to be deployed at a given RCI, the RCM may receive an indication of the impending software deployment, and the portion of the DU workload that was being handled by that RCI may be migrated or transferred to another RCI. Because replicated state information is already accessible from the destination RCI (the RCI to which the workload is being transferred or migrated), the destination RCI can immediately start processing user plane messages of the transferred portion of the workload, and the user experience of end users of the RBA may not be affected by the transfer of the workload. By setting up multiple RCIs capable of implementing DU L2 network functions, replicating RBA state information and virtualizing the NFA such that each RCI can share access to the NFA, RBA workload of a given virtualization server can be migrated very quickly. Such migrations or transfers can be initiated for a variety of reasons or triggering conditions, including but not limited to scheduled maintenance events such as software upgrades of the kind mentioned above, detection of errors/failures/crashes at the RCIs, and so on. Workload at the L1 or NFA layer can also be migrated in a similar manner among the NFA sub-units, e.g., in response to triggering conditions such as scheduled firmware upgrades, detected errors/failures at individual sub-units, and the like. Metrics and data about the current status of an RBA (such as the number of compute instances set up, the workload distribution among the compute instances, the number of workload transfers or migrations that have been performed etc.) can be provided to RBA administrators via programmatic interfaces.

As one skilled in the art will appreciate in light of this disclosure, certain embodiments may be capable of achieving various advantages, including some or all of the following: (a) enhancing the availability and robustness of radio-based applications that are implemented at least partly at edge locations of cloud provider networks for latency reasons, where individual edge locations may in some cases have a limited amount of computing resources, (b) improving the user experience of end users of radio-based applications, e.g., by enabling transparent updates of newer versions of software or firmware without causing application quality reductions or extended downtimes and/or (c) improving the user experience of administrators of radio-based applications by simplifying the management and administration of the applications using provider network tools and interfaces.

According to some embodiments, a system may comprise one or more control plane servers (CPS s) of a cloud provider network, and a virtualization server (VS) at an edge location or edge premise of the cloud provider network (a location other than a primary data center of the cloud provider network). The VS, which may also be referred to as an RBA processing server or RPS, may comprise a network function accelerator (NFA) for RBAs, and an RBA configuration manager or RCM. The RCM may comprise one or more processes or threads in various embodiments. RCMs may also be referred to as RBA workload managers. In at least one embodiment, respective subcomponents of the RCM may run at several layers of the software stack of the VS and/or at the NFA, including virtualization management layers, operating system layers, firmware/software at an NFA card within which the NFA is incorporated, user-mode programs, and so on. As such, an RCM may be implemented in such embodiments as a collection of distinct components or programs working collectively to perform RBA configuration tasks at a given VS or RPS.

The RCM may receive configuration information of a particular RBA which is to be implemented using the VS from a CPS. The configuration information may for example include an indication of an expected or anticipated workload of the RBA which is to be handled at the VS in some embodiments, which may have been provided to the CPS by an owner or administrator of the particular RBA. A plurality of compute instances (CIs) may be launched at the VS, e.g., by a CPS or by the RCM, including a first CI and a second CI.

In response to receiving the configuration information, in various embodiments, the RCM may assign the first CI to process user plane messages of a first portion of a workload of the RBA. In one embodiment, the CIs may be launched by the RCM after the configuration information is received. In at least some embodiments, the first CI and the second CI may comprise respective sets of distributed unit (DU) or L2 network function implementation programs, while the NFA may be utilized to run at least some L1 network functions. A respective virtualized representation of the NFA may be presented or made accessible to each of the CIs in some embodiments, e.g., by virtualization management components such as hypervisors running at the VS in response to commands from a CPS or from the RCM. The virtualized representations may for example enable individual CIs to access and use the NFA as though the NFA were being used solely or exclusively by that CI, even though the hardware of the NFA is being shared, in a manner analogous to the way virtualized representations of other hardware devices (such as virtualized CPUs or virtualized I/O hardware devices) of the VS enable CIs to utilize those devices as though the devices were available for exclusive use. Each virtualized representation may enable access to the NFA via respective sets of virtual interfaces in some embodiments. A user plane message of the RBA (originating at the NFA, and comprising a result of a network function executed at the NFA) may, for example, be received at the first CI via such an interface of a first virtualized representation.

According to some embodiments, the RCM may cause state information of the RBA to be replicated at (or made accessible from some shared storage or memory to) the first compute instance and the second compute instance. The replicated state information, which may comprise (or be derived from) contents of control plane messages of the RBA (received for example from a centralized unit or CU of the RBA), may be used at individual ones of the compute instance to process user plane messages of the RBA workload in various embodiments. For example, the first CI may use the state information to process user plane messages of the first portion of the workload.

In various embodiments, the RCM may determine that a triggering condition for transferring/migrating the first portion of the workload from the first CI has been met. Any of a variety of triggering conditions may lead to such a transfer, such as a notification from a CPS of a planned or scheduled maintenance event comprising a software upgrade of the L2/DU implementation programs at the first CI, a determination by the RCM that the number of errors/failures at the first CI has exceeded a threshold, a crash or unexpected exit at the first CI, and so on. In response to determining that the triggering condition has been satisfied, the RCM may cause subsequent user plane messages of the first portion of the workload (which would otherwise have been delivered to the first CI because of the initial assignment of the first CI to process those messages) to instead be delivered to the second CI. For example, the second CI may receive and process (using the replicated state information of the RBA) a second user plane message comprising results of another network function executed at the NFA. The second user plane message may be received via an interface of a second virtualized representation of the NFA at the second CI. Note that in various embodiments, RBA user plane messages obtained from CUs or other higher layers of the radio-based technology stack may also be redistributed among CIs in response to triggering conditions of the kind discussed above, not just user plane messages received from the NFA.

According to some embodiments, RBA control plane messages received at the VS (e.g., from another server at which a CU of the RBA is implemented) may be mirrored or replicated to the CIs running at the VS to ensure that the CIS have access to the same state information. For example, a state information distribution manager (which may be implemented as a subcomponent of the RCM, or as a program separate from the RCM) may receive a control plane message, and transmit respective replicas of the control plane message to the first CI and the second CI. In another embodiment, a different approach may be used, in which a control plane message of the RBA may be received first at one of the CIs (e.g., the first CI), and used to update a local copy or local version of the state information. Subsequently, the CI that received the control plane message may send an indication of the update to one or more other CIs running at the same VS, in effect relaying the updated state information to the other CIs, enabling the other CIs to update their own versions or copies of state information.

In one embodiment, each of the CIs launched at a VS at which DU L2 network functions are to be run may be assigned a respective portion of the workload of the RBA during a default mode of operation (i.e., prior to migrations/transfers of workload portions). For example, if there are two CIs at the VS, and a total of N cells' traffic is being processed at the VS, the traffic of approximately N/2 cells may be assigned to each of the CIs. Information about the total number of cells whose traffic is to be processed at the VS may be provided by a CPS to an RCM in some embodiments, and used by the RCM to distribute respective cells' workload to various CIs. In other embodiments, at least some of the CIs may be initially configured in passive mode (i.e., without being assigned user plane message workloads) while still being provided access to the RBA state information, so that they can quickly enter an active node of operation if/when a trigger for workload migration is detected.

In at least some embodiments, an NFA may be incorporated within a hardware card attached or linked to the primary processors of the VS via a peripheral interconnect such as a PCIe (Peripheral Component Interconnect-Express) interconnect or a USB (Universal Serial Bus) interconnect. Such a card, referred to as a network function accelerator card (NFAC), may for example include one or more memories and one or more processors or cores, with the memory or memory storing instructions that when executed on the processor(s) implement the logic of the NFA. Respective cores may be used to process L1 network functions in parallel, for example, and may each represent a respective L1 implementation sub-unit in some embodiments.

In one embodiment, the VS may comprise a virtualization management offloading card (VMOC), which may also be connected to the primary processors via such a peripheral interconnect. The VMOC may be used to run a subset of virtualization management tasks of the VS, and may for example include a virtualization controller (responsible, among other tasks, for assigning respective portions of the main memory of the VS to respective compute instances) and a network virtualization controller (responsible, for example, for implementing encapsulation protocols of the provider network, used to manage physical-to-virtual network address translations and the like). In at least one embodiment, an NFA may be incorporated within a VMOC.

As stated earlier, network functions of a DU or L2 layer may be run at compute instances of a VS, while network functions of an L1 layer may be run at NFAs in at least some embodiments. A network function is a functional building block within a network infrastructure, which has well-defined external interfaces and a well-defined functional behavior. Network functions can be chained together to form communications services. Network functions have historically been implemented as a physical network appliance or node; however network functions can be virtualized as well. The core and RAN (radio access network) network functions referenced herein can be based at least partly on the 3rd Generation Partnership Project (3GPP) specifications, European Telecommunications Standards Institute (ETSI) specifications, and/or other wireless communications standards in some implementations. RAN network functions are used in a radio network, typically running in cell towers and performing wireless signal to IP (Internet Protocol) conversion. Core network functions typically run in large data centers performing subscriber related business logic and routing IP traffic to the internet and back. According to the present disclosure, both core and RAN network functions can additionally or alternatively be run on an radio-based application processing server (RPS) provisioned as a virtualization server by a cloud provider, for example an edge device provisioned to a customer to implement a private 5G network, or used by a wireless service provider or the cloud provider to create a public 5G network. The term "radio-based application" (RBA) is used herein to refer to applications in which at least some messages are transmitted using radio frequency signals and associated antennas, such as those used for various generations (4G, and the like) of cellular broadband technologies. RPSs may also be referred to as radio access network (RAN) pipeline processing servers, RAN servers, RAN application servers, or as radio-based application servers. Note that the techniques described herein are not limited to any particular generation of cellular broadband, nor are they limited to applications that utilize any particular portion of the electromagnetic spectrum for message transmissions.

According to some embodiments, multiple NFAs may be incorporated within an NFAC, or multiple NFACs may be incorporated within a given VS, with each NFA being employed for executing a respective set of network functions of one or more RBAs. In some cases, different network functions of a single RBA may be executed at respective NFAs. In other cases, respective NFAs at a VS may be employed to execute network functions of respective applications.

In some embodiments, a virtualization server being used as an RPS may be set up as part of an extension resource group (ERG) of the cloud provider network configured at an edge location or premise external to the primary data centers of a provider network, while control plane servers of the cloud provider network may be located at the primary data centers. An ERG may be located, for example, in the vicinity of to a set of cell towers or antennas, in response to requests from virtualized computing service (VCS) clients wishing to run radio-based applications on resources managed by the VCS control plane. In other embodiments, RPSs may be set up at local zones, third-party data centers and/or at the data centers of the provider network. A given ERG may share some administrative resources among its member servers in some embodiment, such as a local agent of the VCS control plane. In at least some embodiments, the servers used for ERGs may be configured by the provider network operator with the appropriate hardware (e.g., including network function accelerator cards), software and firmware and then shipped to the premises where the ERGs are utilized. In some embodiments, at least some of the servers such as RPSs may require relatively little physical space (e.g., some RPSs supplied by the provider network operator, may only take up one rack unit (1U) or a small number of rack units in a standard data center rack). In at least some embodiments, the RPSs set up as part of ERGs or run at premises external to the data centers of the provider network may comprise a number of hardware, software and/or firmware elements that are especially designed to enable remotely generated virtualization-related administrative commands to be executed in a safe and secure manner, without for example requiring messages to be sent back to the sources from which the command were originally issued. In some embodiments, such elements may include trusted platform modules (TPMs) or other security modules incorporated within the offloading cards, tamper-resistant storage devices whose contents can only be decrypted as long as the storage devices are physically attached to a particular RPS and so on. In at least some embodiments, such an RPS may comprise a VCS control plane agent that does not make outbound calls and implements an API for inbound commands that is protected using TLS (Transport Layer Security) sessions. Such an API may have strong authorization, authentication and accounting-related controls in various embodiments. In at least some embodiments, no shared secrets associated with virtualization management may be stored within an RPS itself.

In some embodiments, a secure network channel, such as a virtual private network (VPN) tunnel or VPN connection, may be established between an RPS and resources located within the provider network data centers, and such a channel may be employed for sending commands from the VCS (or other services of the provider network, such as an RBA management service) to the RPS. For example, respective one way secure network channels may be used to transmit commands originally generated at the control plane servers in response to client requests (including requests to launch RCIs) for eventual execution at an RPS. In one embodiment, a secure channel to be used for such commands may be set up between one or more resources at an RPS (such as a VCS connectivity manager) and one or more resources within an IVN of the client at whose request an RCI is to be launched at the RPS.

An RPS can serve as a source or destination of several different types of IP traffic, including traffic between different layers of a radio-based technology stack being used for RBAs, traffic to and from other resources within the provider network, traffic to and from resources in client networks established at client premises, traffic to and from the public Internet, and so on. A given RPS can be equipped with several different kinds of networking hardware devices (NHDs) that can be employed for the IP traffic, including for example default network interface cards, networking chipsets within NFAs, networking chipsets within virtualization management offloading cards, and so on. Network management logic provided by the provider network can be used to intelligently select the most appropriate NHD to be used for a given category of IP traffic of an RPS during a given time interval, thus enabling the best use of the available IP networking resources of the RPS to achieve quality of service targets of the applications being run at the RPS. For example, depending on the types of RBAs being run, a different NHD can be used for front-haul traffic of the radio-based applications than is used for mid-haul traffic for at least some time periods. Software programs (e.g., programs developed by third-party vendors or by the provider network operator) which implement part of a RBA can be run within runtime environments (RTEs) such as radio-optimized compute instances or radio-optimized software containers at an RPS. In some embodiments, a given RPS or a given NFA may be employed for several different RBAs or pipelines, e.g., on behalf of a single client of the provider network or on behalf of different clients. As a result of such multi-tenancy, the overall amount of computing resources and/or power consumed for implementation of several different RBAs can be reduced substantially. The reduction in the resources used, which can translate into lower costs, in turn enables new entrants into the radio-based application space, and the design of new types of applications.

According to some embodiments, a provider network may comprise a radio-based application management service (RBAMS) which implements programmatic interfaces pertaining to the configuration of RPSs. An indication of an expected geographical distribution of end-user requests (e.g., cell phone calls, text messages, IoT sensor inbound and outbound messages, etc.) of a radio-based application may be obtained at the RBAMS via such programmatic interfaces. The information about the geographical distribution may be used at the RBAMS to select or recommend one or more premises at which ERGs and/or RPSs of one or more categories supported by the provider network should preferably be configured for the client. If the client indicates an approval of the recommendations, one or more RPSs may be configured on behalf of the client at such premises and assigned to the clients' applications by the RBAMS in such embodiments. The premises may include, for example, a point-of-presence site of the provider network, a local zone premise of the provider network, or a client-owned premise.

In one embodiment, a given network function accelerator (NFA) (or a portion of an NFA) at an offloading card may be configured for exclusive use for a single client of the provider network (or a single radio-based application of a client on whose behalf multiple radio-based applications are run), e.g., in response to a single-tenancy request from the client. Multiple NFAs of a single RPS (e.g., at a single offloading card) may be employed for a single radio-based application in some embodiments. Respective NFAs of a given offloading card may be employed for respective RBAs in other embodiments.

In at least some embodiments, a variety of metrics may be collected (e.g., by control plane servers of the VCS or the RBAMS) from the RPSs and provided to clients via programmatic interfaces if desired; such metrics may include inbound or outbound message transfer counts or message transfer rates, counts of migrations, mappings of cells to RCIs or L1 sub-units, failure rates of NFAs, utilization levels of the local processors, memory and other resources of the NFAs, and so on in different embodiments. In one embodiment, metrics (e.g., resource utilization information) from multiple NFAs at an RPS may be collected and used to select which particular NFA should be utilized to execute a particular network function.

As mentioned above, an RPS may be configured at least in part using resources of a provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters its primary data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network or as a VCS extension resource group. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices, antennas or other telecommunication equipment, and/or workloads.

As mentioned above, some cloud provider networks may provide support for local zones, a type of infrastructure deployment that places some of the provider network's compute, storage, database, and other select services close to large population, industry, and IT centers or other desired locations which may not be very near the provider network's primary data centers. With such local zones, applications that need single-digit millisecond latency can be run closer to end-users in a specific geography. Local zones provide a high-bandwidth, secure connection between local workloads and those running in a provider network region, allowing provider network clients to seamlessly connect to their other workloads running in the region and to the full range of in-region services through the same APIs and tool sets.

The cloud provider network may implement various computing resources or services, which may include a virtualized computing service (VCS), a radio-based application management service (RBAMS), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, a VCS or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores, NFAs or other accelerators), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. RBA components may be run using containers in at least some embodiments. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which the availability of distributed units (DUs) of radio-based applications, implemented at edge locations of a cloud provider network, may be enhanced with the help of virtualized representations of network function accelerators and replication of application state information, according to at least some embodiments. As shown, system 100 includes resources of a virtualized computing service (VCS) 110 and a radio-based application management service (RBAMS) 192, with the resources of the VCS being distributed among data centers 101 of a provider network and some number of VCS edge locations (ELs) such as EL 130A and EL 130B. Along with the resources at data centers 101, any combination of several different categories of edge locations, such as local zones, client premises, and the like may be used for running applications of clients of the VCS and/or the RBAMS, including radio-based applications, in the depicted embodiment.

The data centers 101 may include control plane servers responsible for administrative tasks associated with various network-accessible services implemented at the provider network, such as control plane servers 141 of VCS 110 and control plane servers 193 of the RBAMS. Control plane servers 141 of the VCS may include provisioning managers 102 responsible for acquiring and allocating virtualization servers (VSs) and other resources, and instance state change managers 103 responsible for initiating the workflows for starting up, migrating, pausing, and/or terminating the execution of compute instances (virtual machines) at the virtualization servers. The control plane servers 193 of the RBAMS may be responsible for providing workload and other configuration information of RBAs to virtualization servers utilized for running various portions of the RBAs.

Data plane servers 145 of the VCS at data centers 101 of the provider network may comprise VSs 117A and 117B. The VCS edge locations such as EL 130A and EL 130B may include additional VSs which are part of the VCS data plane, such as VS 160A at EL 130A and VS 160B at EL 130B in the depicted embodiment. VS 160A and VS 160B may also be referred to as radio-based application processing servers or RPSs, as they may comprise respective network function accelerators (NFAs) which can be utilized to efficiently execute one or more types of network functions of RBAs in the depicted embodiment. A given NFA may comprise a chip set (e.g., a system-on-chip or SOC) and associated firmware/software incorporated within a hardware card attached to the primary processors of the VS via a peripheral interconnect such as a PCIe interconnect or a USB interconnect in the depicted embodiment. Note that in some embodiments, at least a subset of VSs 117 located at the primary data centers of the provider network may also include NFAs and may therefore be used as RPSs. In the embodiment shown in FIG. 1, ELs 130A and 130B may not include control plane servers of the VCS and/or the RBAMS; instead, administrative tasks for VSs 160 located at the ELs may be performed by control plane servers at the data centers 101.

A VS may include a set of virtualization manager components (VMCs) 126 such as VMCs 126A or 126B (e.g., hypervisors running on the primary processors of the VS and/or virtualization management components running at an offloading card linked to the primary processors via a peripheral interconnect) in the depicted embodiment. A VS configured as an RPS, such as VS 160A or VS 160B, may also include a respective RBA configuration manager (RCM) such as RCM 135A or RCM 135B, responsible among other tasks for distributing RBA DU or L2 workloads among radio-optimized compute instances launched at the VS. In the embodiment depicted in FIG. 1, a VS 160 may comprise a plurality of radio-optimized compute instances or RCIs, such as RCI 125A and RCI 125B at VS 160A, and RCIs 125C and 125D at VS 160B. A given RCI may include a set of programs implementing or executing at least some DU/L2 network functions of one or more RBAs. Such programs may be included in the software installed by default within the RCIs; as such, in contrast to other general purpose compute instances, the compute instances with such software may be described as being radio-optimized. In some embodiments, a given EL may comprise a single VS, which may help keep the costs of RBA implementations low for large RBAs which may utilize hundreds or even thousands of ELs. In other embodiments, one or more ELs may comprise multiple VSs configured as RPSs. While the RCIs may be employed for executing at least some L2 network functions of RBAs, one or more L1 or physical layer network functions of the RBAs may be implemented at the NFAs. A given NFA may also be linked via a network channel to one or more radio units (RUs) of one or more RBAs, with the RUs in turn being associated with one or more cells such as cells 154A (linked to NFA 118A) and cells 154B (linked to NFA 118B) of the RBAs. A given cell may include cell software 155 (e.g., cell software 155A or 155B) and a set of antennas 156 (e.g., antennas 156A or 156B) which are used to receive/transfer radio signals from a set of end-user devices 177 of an RBA (e.g., end-user devices 177A in the case of antennas 156A, and end-user devices 177B in the case of antennas 156B). An end-user device (also referred to as user equipment or UE) may comprise, for example, a cell phone, a tablet, an Internet-of-Things (IoT) device such as a sensor or a smart appliance, and the like in various embodiments. Note that in some implementations, one or more L1 network functions may be implemented at an RCI. In one implementation, a given NFA may implement network functions at layers other than L1—e.g., one or more L2 network functions may be implemented at an NFA.

In the embodiment depicted in FIG. 1, an RBA owner or manager, such as a mobile network operator or an administrator of an enterprise network, may provide information about an RBA's targeted geographical workload distribution to a control plane server 193 of the RBAMS and/or a control plane server 141 of the VCS via one or more programmatic interfaces (such as web-based consoles, command-line tools, graphical user interfaces, or application programming interfaces (APIs). A proposed configuration of the RBA, indicating a set of ELs 130 which should be utilized to run L2 and L1 network functions of the RBA, may be determined or identified based on analysis of the provided information. If the proposed configuration or layout is approved, a control plane server 193 or 141 may then provide a subset of the overall configuration information to an RCM at a VS of a given EL selected for the RBA, enabling the RCM to perform local configuration operations for the RBA.

In various embodiments, in response to receiving configuration information of the RBA from the control plane server, an RCM at a VS may assign a first RCI of a plurality of RCIs launched at the VS to process user plane messages of a first portion of a workload of the RBA. In some embodiments, the RCM may first cause the RCIs to be launched by the VMCs of the VS and then distribute the RBA workload portions among the RCIs; in other embodiments, the RCIs may be launched in response to requests issued by the RBA owner/administrator to the VCS control plane. To assign respective portions of the workload to respective RCIs, an RCM may generate metadata or mappings indicating the particular RCI to which messages associated with a given RBA cell should be directed in some embodiments; such metadata/mappings may for example be propagated to an NFA 118 and/or to RBA network message handlers running at the VS. In various embodiments, a respective virtualized representation of an NFA of a VS may be presented or made accessible individual ones of the RCIs of the VS, e.g., by the VMCs in response to requests issued by the RCM. User plane messages of the first portion of the workload may be received at the first RCI via an interface (e.g., a virtual function or VF interface) of a first virtualized representation of the network function accelerator in some embodiments, and such user plane messages may comprise results of network functions executed at the NFA. In at least some embodiments, the overall L2 workload expected at the VS (which may comprise user plane messages of a plurality of cells 154) may be distributed among the different RCIs, such that each RCI is responsible for processing user plane messages associated with one or more cells. In some embodiments, an NFA may comprise multiple L1 implementation sub-units, such as a plurality of processing cores, and the RCM may similarly assign respective portions of the overall L1 workload to individual ones of the sub-units. In one such embodiment, a mapping between the cells and the L1 sub-units of the NFA may be generated by and propagated to the NFA by the RCM.

In at least some embodiments, the RCM of a VS may cause state information of the radio-based application to be replicated (or accessible from a shared storage/memory location) at individual ones of the RCIs. The replicated/shared state information may be used by the DU or L2 implementation programs at the RCIs to process user plane messages of any portion of the workload; for example, RCI 125A may use the state information to process a first portion of the workload during normal operating conditions when migration of workload across RCIs has not been initiated, RCI 125B may use the state information to process a second portion of the workload during normal operating conditions, and so on. Because the state information is replicated, any of the RCIs may be enabled to quickly take up processing of other portions of the RBA workload as needed.

An RCM of a VS may initiate migration/transfer of RBA workloads from one RCI at a VS to another RCI at that VS in various embodiments in response to detected triggering conditions. In response to a determination that such a triggering condition for transferring a first portion of the workload from a first RCI (e.g., RCI 125A) has been met, the RCM (e.g., RCM 135A) may cause at least a particular user plane message of the first portion of the workload to be directed to a second RCI (e.g., RCI 125B) instead of the first RCI. The particular transferred user plane message may for example comprise a result of a network function executed at the NFA, and the second RCI may obtain the particular user plane message via an interface of the virtualized representation of the NFA which is accessible to the second RCI in some embodiments. The second RCI may utilize the replicated state information to process the particular user plane message and any additional user plane messages of the transferred portion of the workload in various embodiments.

Note that user plane messages may in general in both directions (e.g., from higher layers such as Layer 3 (L3) of the radio-based technology stack towards the L1 layer, and from lower layers such as L1 towards higher layers such as L3). An RCM 135 may in at least some embodiments cause responsibility for user plane messages flowing in either direction to be distributed among the different RCIs, and cause messages flowing in either direction to be transferred or migrated from one RCI to another as and when triggering conditions for such migrations are detected. Triggering conditions for such migrations/transfers may include, among others, determinations that scheduled maintenance events (such as software upgrades) at the source RCI (the RCI whose workload is being transferred to another RCI), detection of occurrences of failures/errors/crashes at the source RCI and so on in different embodiments.

Any of a number of different techniques may be employed in different embodiments to ensure that the state information that is required for processing user plane messages at the RCIs is available at multiple RCIs. For example, in one embodiment the RCM may comprise or configure a state information distribution manager, which receives control plane messages (containing the state information) from sources such as centralized units (CUs) of the RBAs, and causes replicas of such control plane messages to be sent to multiple RCIs. In another embodiment, instead of such replication of control plane messages by entity such as a state information distribution manager, each of the RCIs may be responsible for relaying or forwarding changes to state information (resulting for example from receiving control plane messages) to other RCIs. In one embodiment, state information of the RBA may be stored at a shared memory or shared storage location at the VS, assessable from multiple RCIs.

Figure 2:
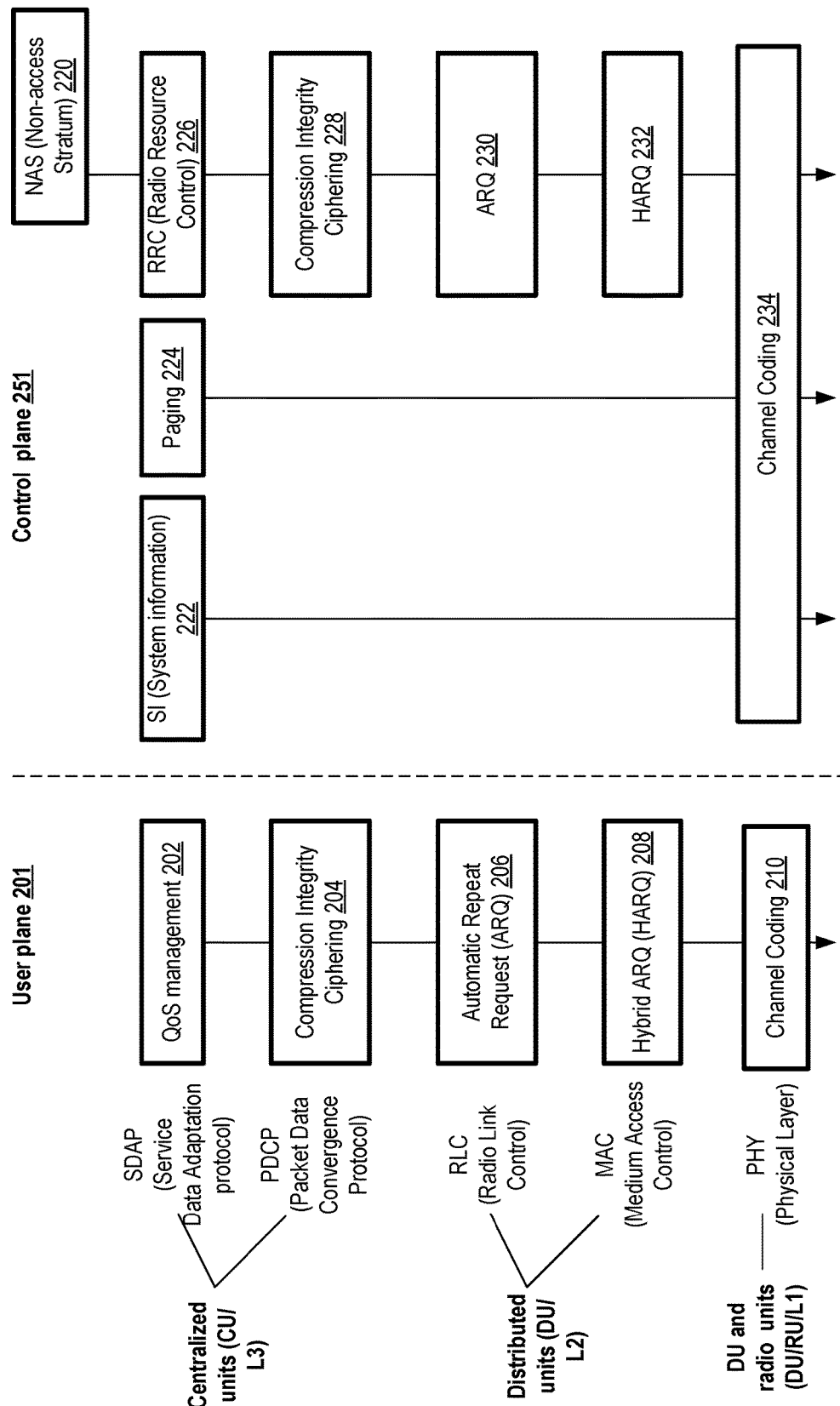
FIG. 2 illustrates an overview of user plane and control plane layers defined in accordance with a radio-based application technology standard, according to at least some embodiments.

FIG. 2 illustrates an overview of user plane and control plane layers defined in accordance with a radio-based application technology standard, according to at least some embodiments. The arrows shown in FIG. 2 represent the downlink communication path (from the higher levels of the standard, often implemented at back-end servers, downwards to the lower levels which are implemented using front-end components such as radio antennas and network function accelerators of the kind introduced above). The depicted layers conform to a 5G-NR (Fifth Generation-New Radio) standard published by 3GPP (Third Generation Partnership Project), a group of organizations responsible for defining protocols for mobile communications; similar layers are also defined for other generations of cellular communication technology.

In a manner somewhat analogous to the subdivision, discussed above, of a provider network functionality into control plane and data plane functionality, the operations needed for radio-based applications are divided into control plane operations and user plane operations. Control plane operations include connection configuration and other administrative tasks such as monitoring, while user plane operations involve transmission of user data using Internet Protocol (IP) packets. Contents of control plane messages may indicate changes to RBA application state, and the state information thus obtained and updated may be used to process user plane messages.

The 5G-NR protocol stack comprises three layers, referred to as L1 (layer 1), L2 (layer 2) and L3 (layer 3). Standardized interfaces for communications between the layers (and between sub-layers of individual layers) have been defined; this allows network functions of the layers and sub-layers to be mapped flexibly to different hardware and/or software components as long as the interfaces and performance requirements of the protocol stack can be met. Logic for executing the functionality of the layers is distributed among three types of components: centralized units (CUs) for L3 operations, distributed units (DUs) used for L2 operations and optionally for some L1 operations, and radio units (RUs) used for at least a subset of L1 operations. L1 is also referred to as the physical layer (PHY). L2 comprises the MAC (Medium Access Control) and RLC (Radio Link Control) sub-layers. L3 may include sub-layers for PDCP (Packet Data Convergence Protocol) and SDAP (Service Data Adaptation Protocol). Operations of user plane 201 may include quality of service (QoS) Management 202 and Compression Integrity Ciphering 204 in L3, Automatic Repeat Request (ARQ) processing 206 and Hybrid ARQ (HARQ) processing 208 in L2, and Channel Coding 210 at the PHY layer. Operations of control plane 251 may include Non-access Stratum (NAS) 220 protocol tasks, System Information (SI) 222 tasks, Paging 224, Radio Resource Control (RRC) 226 and Compression Integrity Ciphering 228 in L3, ARQ 230 and HARQ 232 in L2, and Channel Coding 234 in the PHY layer. At least some of the layers and protocols shown in FIG. 2 may comprise the execution of respective sets of network functions. In at least some embodiments, a subset of the network functions corresponding to L1, L2 and/or L3 may be implemented using NFAs of the kind introduced above. In at least one embodiment, a subset of the network functions corresponding to L1, L2 and/or L3 may be implemented at radio-optimized compute instances or RCIs.

Figure 3:
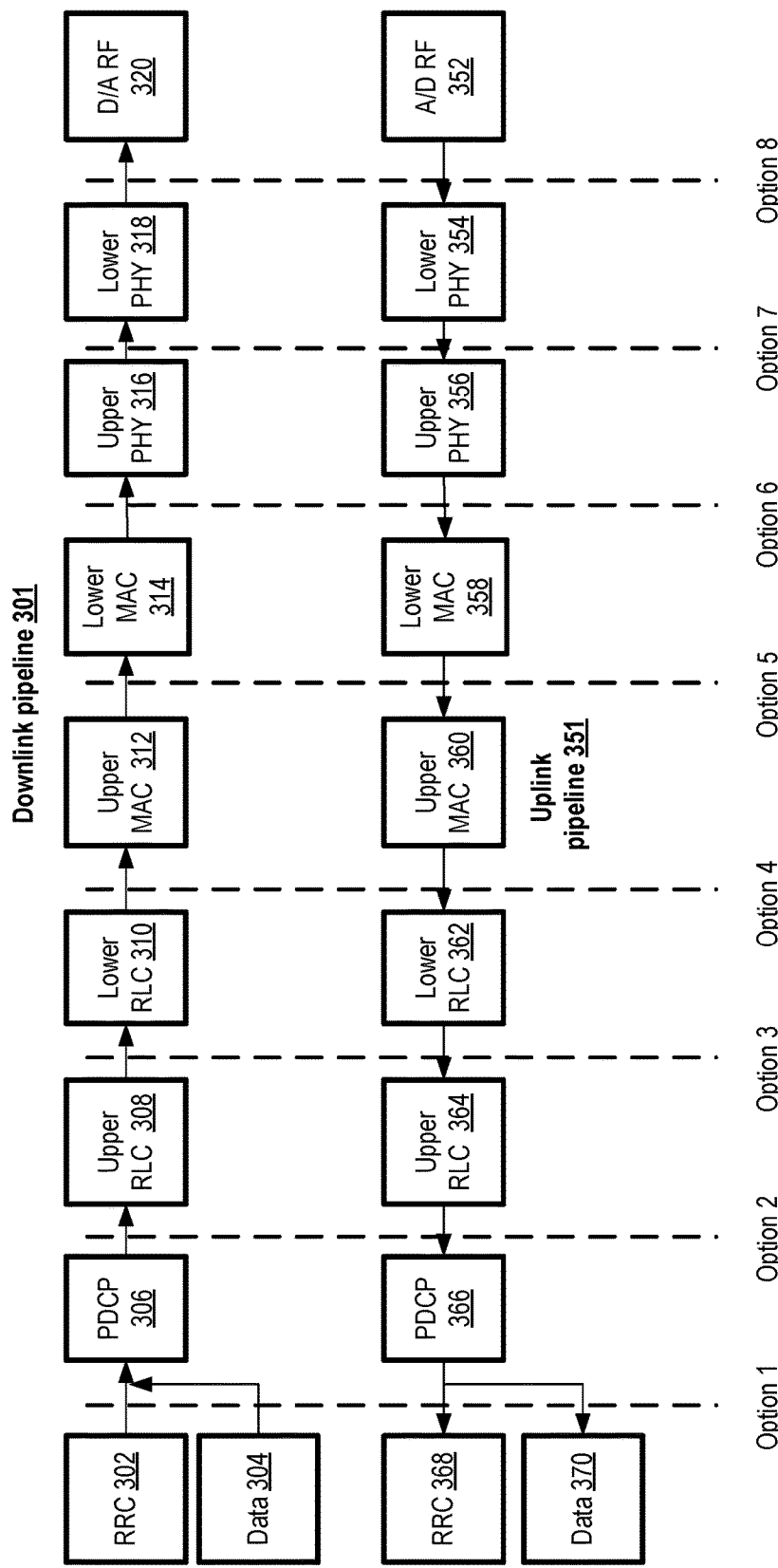
FIG. 3 illustrates example uplink and downlink pipelines of network functions for radio-based applications, according to at least some embodiments.

FIG. 3 illustrates example uplink and downlink pipelines of network functions for radio-based applications, according to at least some embodiments. Standards organizations have define several options for splitting the functions of the pipelines among the CUs (Centralized Units) and DUs (Distributed Units), which are indicated by the dashed line labeled Option 1, Option 2, . . . , Option 8 in FIG. 3. Such splits make it possible to distribute the workload for radio-based applications across several different devices, instead of relying on monolithic devices responsible for performing all the functions.

The downlink pipeline 301 starts with RRC (Radio Resource Control) 302 and Data 304 and ends with digital to analog radio frequency (D/A RF) operations 320. In between, the downlink pipeline includes, in sequence, respective sets of network functions for PDCP (Packet Data Convergence Protocol) 306, Upper RLC (Radio Link Control) 308, Lower RLC 310, Upper Medium Access Control (MAC) 312, Lower MAC 314, Upper PHY (physical layer) 316, and Lower PHY 318. The uplink pipeline 351 starts with analog-to-digital radio frequency (A/D RF) operations 352, and ends with RRC 368 and Data 370. In between, network functions are executed in sequence for Lower PHY 354, Upper PHY 356, Lower MAC 358, Upper MAC 360, Lower RLC 362, Upper RLC 364, and PDCP 366. In various embodiments, at least some network functions of the Upper PHY and/or Lower PHY layers (for uplink and/or downlink) may be implemented using NFAs of the kind discussed above. In some embodiments, network functions of the other layers shown in FIG. 3 may also be implemented at the NFAs. In at least some embodiments, network functions of the RLC and MAC layers may be implemented using software running within radio-optimized compute instances (RCIs) of the kind shown in FIG. 1.

Figure 4:
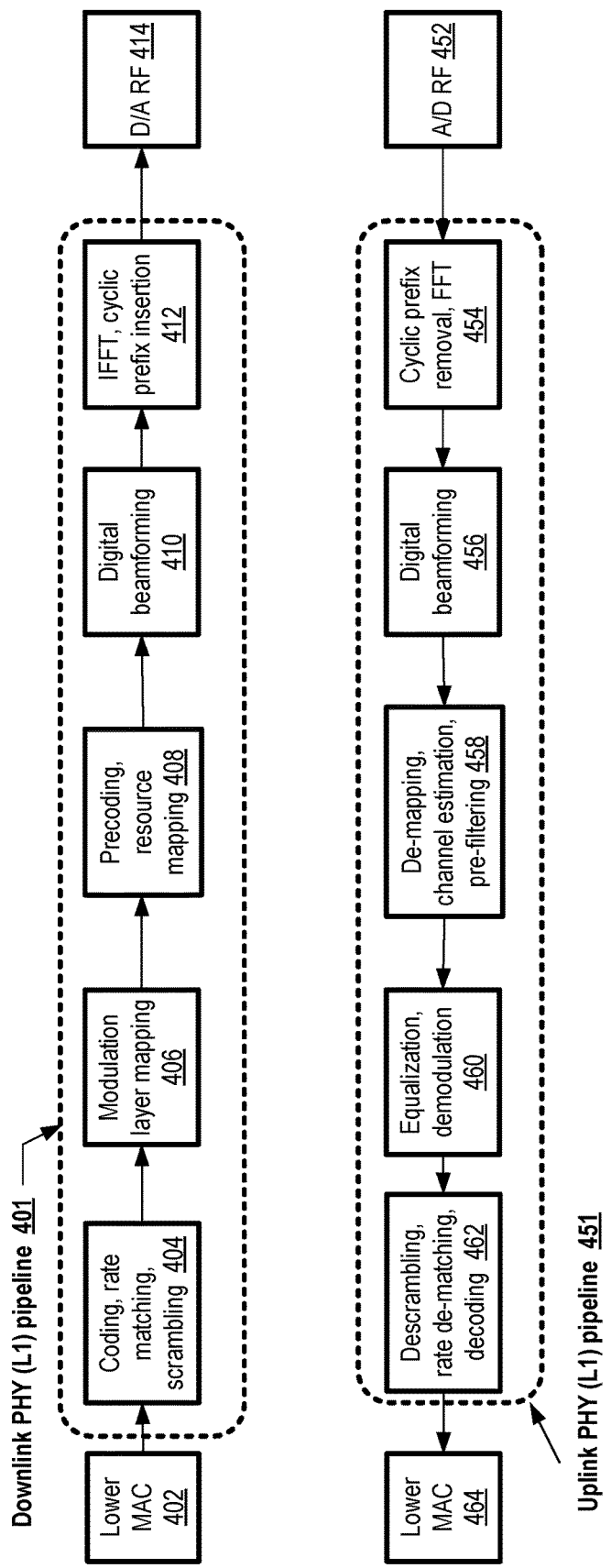
FIG. 4 illustrates example network functions which may be performed at a physical layer of a radio-based technology stack, according to at least some embodiments.

FIG. 4 illustrates example network functions which may be performed at a physical layer of a radio-based application technology stack, according to at least some embodiments. In the downlink PHY (L1) pipeline 401, in which control and data messages are being sent from higher-layer components towards the RUs, the lower MAC stage 402 (which is part of L2) leads to a coding, rate matching and scrambling stage 404, followed by a modulation layer mapping stage 406. This is followed by a precoding and resource mapping stage 408, a digital beamforming stage 410, and an inverse Fast Fourier Transform (IFFT) and cyclic prefix insertion stage 412 before the digital to analog radio frequency (D/A RF) operations 414 are performed. In the reverse direction, when control signals and data are flowing from the radio units towards the L3 components of the pipeline, an analog-to-digital radio frequency operations (A/D RF) stage 452 is followed by cyclic prefix removal and Fast Fourier Transform (FFT) stage 454 of the uplink PHY (L1) pipeline. This is followed by another digital beamforming stage 456, a de-mapping, channel estimation and pre-filtering stage 458, an equalization and demodulation stage 460, and a descrambling, rate de-matching and decoding stage 462 before the Lower MAC stage 464 of L2 is reached.

Each of the stages in the uplink and downlink pipelines 401 and 451 may require a respective set of network functions to be executed. A number of "split options", referred to as split options 7-3, 7-2, 7-2a and 7-1 have been proposed in the industry for distributing the overall combination of network functions between "upper L1" (implemented at DUs) and "lower L1" (implemented at RUs). For example, in the 7-2 split, stages 408, 410, 412, 454, 456 and 458 may be the responsibility of the RUs, with the remaining stages being the responsibility of DUs. In various embodiments, the network function accelerators utilized at radio-based pipeline processing servers (RPSs) may execute network functions of at least some of the pipeline stages shown in FIG. 4 using custom chipsets. For example, network functions implemented at an accelerator may include one or more of: a coding function, a rate matching function, a scrambling function, a modulation layer mapping function, a precoding function, a resource mapping function, a digital beamforming function, a Fast Fourier Transform (FFT) function, a cyclic prefix insertion function, a cyclic prefix removal function, an inverse FFT function, a de-mapping function, a channel estimation function, a pre-filtering function, an equalization function, a demodulation function, a descrambling function, a rate de-matching function, or a decoding function. In at least some embodiments, the network function accelerators may implement DU functionality. In some embodiments, at least a portion of CU functionality may be implemented at RPSs in addition to DU functionality.

Figure 5:
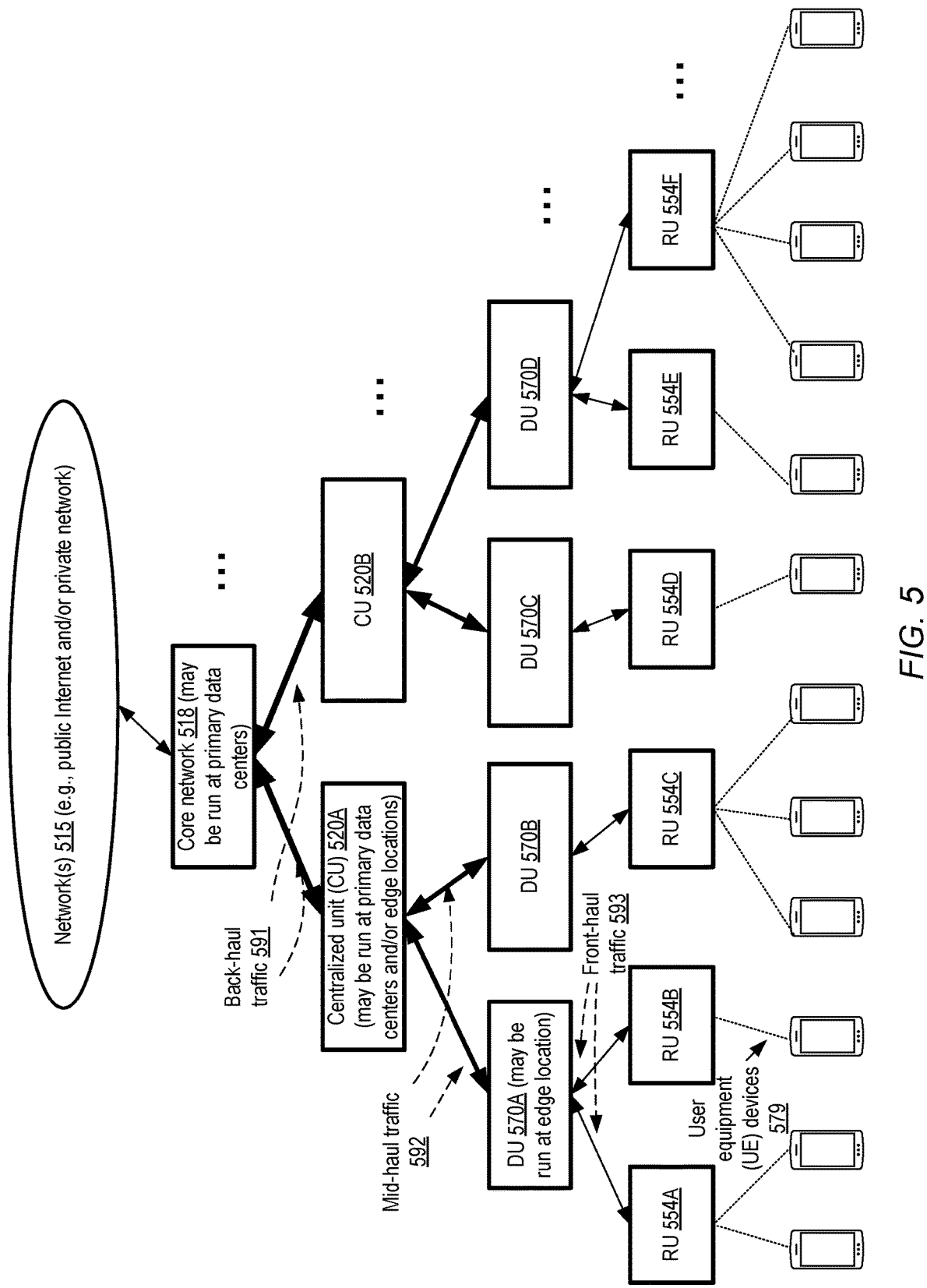
FIG. 5 illustrates an example hierarchy of components which may be used for radio-based applications, according to at least some embodiments.

FIG. 5 illustrates an example hierarchy of components which may be used for radio-based applications, according to at least some embodiments. In the depicted embodiment, servers implementing a core network 518 of an RBA, linked to one or more networks 515 used to transfer the Internet Protocol packets comprising the payloads and control signals of the RBA over large distances, may implement a set of back-end functions associated with radio-based applications, enabling different sub-networks of the overall system to communicate with one another. Network functions performed at the core network layer (referred to as core network functions) may for example include functions to aggregate data traffic from end user devices, authenticate subscribers, apply personalized policies, and/or manage the mobility of devices prior to routing traffic to operator services or the Internet. A given server implementing core network functions may, for example, be located at a provider network data center in one embodiment. A core network server may be connected to one or more servers at which centralized units (CUs) 520, such as CU 520A or CU 520B may be implemented. The traffic between the core network layer and the CUs 520 may be referred to as back-haul traffic 591 in the depicted embodiment. A CU implementation server may, for example, be located within a primary data center of a provider network, or at an edge location in different embodiments.

In the embodiment depicted in FIG. 5, network functions of distributed units (DUs) of the radio-based application technology stack may be implemented at virtualization servers, e.g., at edge locations of a provider network. Each CU may be linked to one or more DUs—e.g., CU 520A may be connected to DUs 570A and 570B, while CU 520B may be linked to DU 570C and DU 570D. The traffic between CUs and DUs may be referred to as mid-haul traffic 592 in various embodiments. Each of the DUs in turn may be linked to one or more radio units (RUs) 554. For example, DU 570A may be linked to RUs 554A and 554B, DU 570B may be linked to RU 554C, DU 570C may be linked to RU 554D, and DU 570D may be linked to RUs 554E and 554F. The traffic between DUs and RUs may be referred to as front-haul traffic 593. Each of the cells may comprise one or more antennas which can be used to receive and transmit radio frequency signals from a variety of wireless user equipment (UE) devices 579. A given RAN node (such as a gNodeB in the case of 5G applications, a 3GPP compliant implementation of a 5G-NR base station) may comprise one or more CUs, one or more DUs and one or more RUs in various embodiments. In some embodiments, network functions of the core network layer, CUs, DUs and RUs may all be implemented at least in part using provider network resources.

Figure 6:
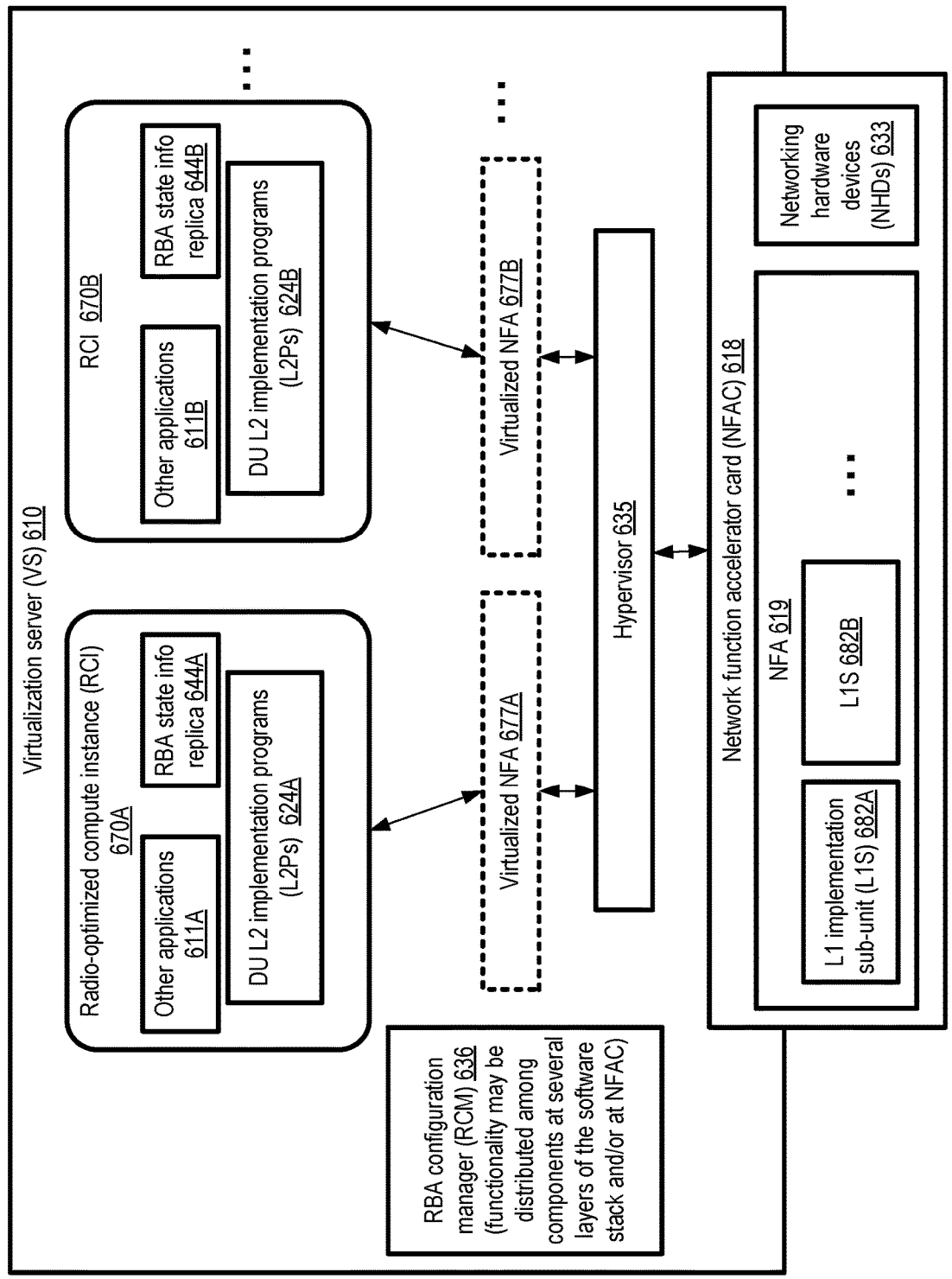
FIG. 6 illustrates example deployments of L2 implementation programs of a radio-based technology stack at compute instances at a virtualization server with a virtualized network function accelerator, according to at least some embodiments.

FIG. 6 illustrates example deployments of L2 implementation programs of a radio-based technology stack at compute instances at a virtualization server with a virtualized network function accelerator, according to at least some embodiments. In the embodiment depicted in FIG. 6, a virtualization server (VS) 610 configured as a radio-based application processing server at an edge location of a provider network may be used to run at least two radio-optimized compute instances (RCIs) 670A and 670B. Each RCI may comprise a set of DU L2 implementation programs, such as L2Ps 624A of RCI 670A and L2Ps 624B of RCI 670B. Other applications 611A (i.e., applications that do not implement L2 network functions) may also be run at RCI 670A, and other applications 611B may similarly be run at RCI 670B. Each RCI may have access to a respective replica of RBA state information, such as replica 644A of RCI 670A and replica 644B of RCI 670B.

The virtualization server 610 may comprise a hypervisor 635 and a network function accelerator card (NFAC) 618 in the depicted embodiment. The NFAC 618 may include at least one NFA 619 and at least one networking hardware device (NHD) 633. The NHD may perform tasks similar to those of a network interface card (NIC) in conventional servers, such as receiving and transmitting network packets. In some embodiments, the virtualization server 610 may also include additional NHDs, e.g., at a virtualization management offloading card. An NFA 619 may in turn comprise multiple L1 implementation sub-units (L1S s), such as L1S 682A and L1S 682B. In some implementations the NFA may comprise multiple processing cores, and each L1S may include at least one such core.

In at least some embodiments in which one or more RCIs are run at a virtualization server, respective virtualized representations of an NFA may be presented programmatically to each of the RCIs by the hypervisor or other virtualization management components. For example, virtualized NFA 677A may be presented to RCI 670A, and virtualized NFA 677B may be presented to RCI 670B. From the perspective of any given RCI, the virtualized representation may grant access to all the functionality that would have been provided had the RCI been granted access to the physical NFA, in a manner analogous to the way in which a virtualized CPU may appear to grant access to a physical CPU. A set of APIs for issuing requests/commands to the NFA and/or receiving messages from the NFA may be included in the virtualized representations. To cause a given network function to be executed at the NFA, a program running at an RCI may invoke an API or interface of the virtualized representation provided to that RCI. Respective virtualized NFAs may be used for respective network slices in some embodiments, enabling multiple RBA or RBA pipelines to be implemented using a shared hardware NFA in the depicted embodiment. In some implementations, the hypervisor may maintain a data structure comprising a number of slots, with each slot representing a respective virtualized view of at least a portion of the computing and/or networking capacity of an NFA, which can be allocated or assigned to a particular L2P for at least some time period.

Individual slots may comprise elements in an array, linked-list, or other similar data structure in some embodiments.

In the embodiment shown in FIG. 6, the virtualization server may include an RBA configuration manager (RCM) 636, responsible among other tasks for causing portions of an RBA's L2 workload to be distributed among the L2Ps at the RCIs, and/or for causing portions of an RBA's L1 workload to be distributed among the L1Ss at the NFA. In some implementations, the RCM itself may comprise several components or programs, distributed at several layers of the software stack of the VS and/or at the NFAC. For example, the RCM may include a state information distribution manager for replicating control plane messages received at the virtualization server from a CU to each RCI, another state information distribution manager for replicating control plane messages generated at the NFA to each RCI, a workload manager responsible for creating and modifying mappings between different portions of the RBA L2 workload and RCIs/L2Ps, another workload manager responsible for creating and modifying mappings between different portions of the RBA L1 workload and LIS s, and so on. In some embodiments, a portion of the RCM may be implemented within a virtualization management component of the VS, such as the hypervisor. In one embodiment in which some virtualization management components are implemented at an offloading card of the VS, a portion of the RCM may be implemented at the offloading card.

In some embodiments, an Upper L1 request handler (not shown in FIG. 6) may be used for processing/forwarding requests generated at L2Ps for network functions at the NFA. In some embodiments, such a request handler may comprise one or more privileged threads or processes, running within the same RCI as the corresponding L2Ps. Such a request handler may receive requests for upper L1 network functions from L2Ps 624 for the downlink portions of the RBA pipeline, e.g., via a set of L2-to-L1 programmatic interfaces designed and implemented at the provider network in some embodiments. The programmatic interfaces may, for example, be based on, or compatible with a standard such as FAPI-NR (functional API-new radio) in at least some embodiments.

An NFA access manager (NFAAM) (also referred to as a network function offloading manager) may be launched at a VS 610 in at least some embodiments, e.g., as part of a virtualization management component such as hypervisor 635. The NFAAM may act as an intermediary between the request handlers and an NFA 619, e.g., in a manner somewhat analogous to the way that hypervisors and other virtualization management components at a general-purpose virtualization host or server can act as intermediaries between software and other hardware components. The NFAAM may for example implement programmatic interfaces (such as virtual functions) usable by the L2Ps at RCIs to access L1 Ss at the NFA.

The results of the execution of an L1 network function at the NFA may be transmitted to one or more radio units of one or more cells from the NFA in some embodiments, e.g., using an NHD 633. For messages flowing from the antennas towards the L2 and L3 layers of the application pipelines (uplink pipeline messages), the workflow may be reversed— the incoming messages may be transmitted to an NFA from the RUs, one or more network functions may be executed at the NFA, and the results may be forwarded via the NFAAM and/or the request handlers to the L2Ps. The L2Ps may then transfer the results of L2 processing further up the stack, e.g., to L3 or CU implementation programs implemented at other servers.

The NFAAM may include a metrics/health state information collector in at least some embodiments, which keeps track of the resource utilization levels of the NFA (e.g., including utilization levels of on-card processors/cores/L1Ss, memory and the like), failures (if any) of NFA components, latencies for completing network function processing at the NFA, and so on. Such metrics may be provided to control plane servers of the VCS and/or RBAMS and used to make various configuration decisions, such as RBA workload migration decisions, whether a given network function should be executed locally or transmitted for remote execution to another server, and so on in different embodiments.

In various embodiments, a VS 610 may provide an implementation of Open Radio Access Network (O-RAN), a disaggregated approach to deploying mobile front-haul and mid-haul networks built on cloud native principles. O-RAN is an evolution of the Next Generation RAN (NG-RAN) architecture, first introduced by the 3GPP. Organizations such as the O-RAN Alliance have developed standards for O-RAN, and VSs utilized as RPSs may be designed to comply with such standards in at least some embodiments. Each of the RBAs being executed at the RPS may belong to one of a set of application areas with respective expectations regarding performance and other quality of service considerations in the depicted embodiment. The ITU-R (International Telecommunication Union-Radiocommunication sector) standards organization has defined at least three such application areas for 5G cellular communication: enhanced mobile broadband (eMBB), massive machine-type communications (mMTC), ultra-reliable and Low Latency Communications (URLLC). A VS 610 with an NFA optimized for one of the application areas may be selected for an RBA based on kinds of workloads expected to be handled by the RBA in various embodiments.

Figure 7:
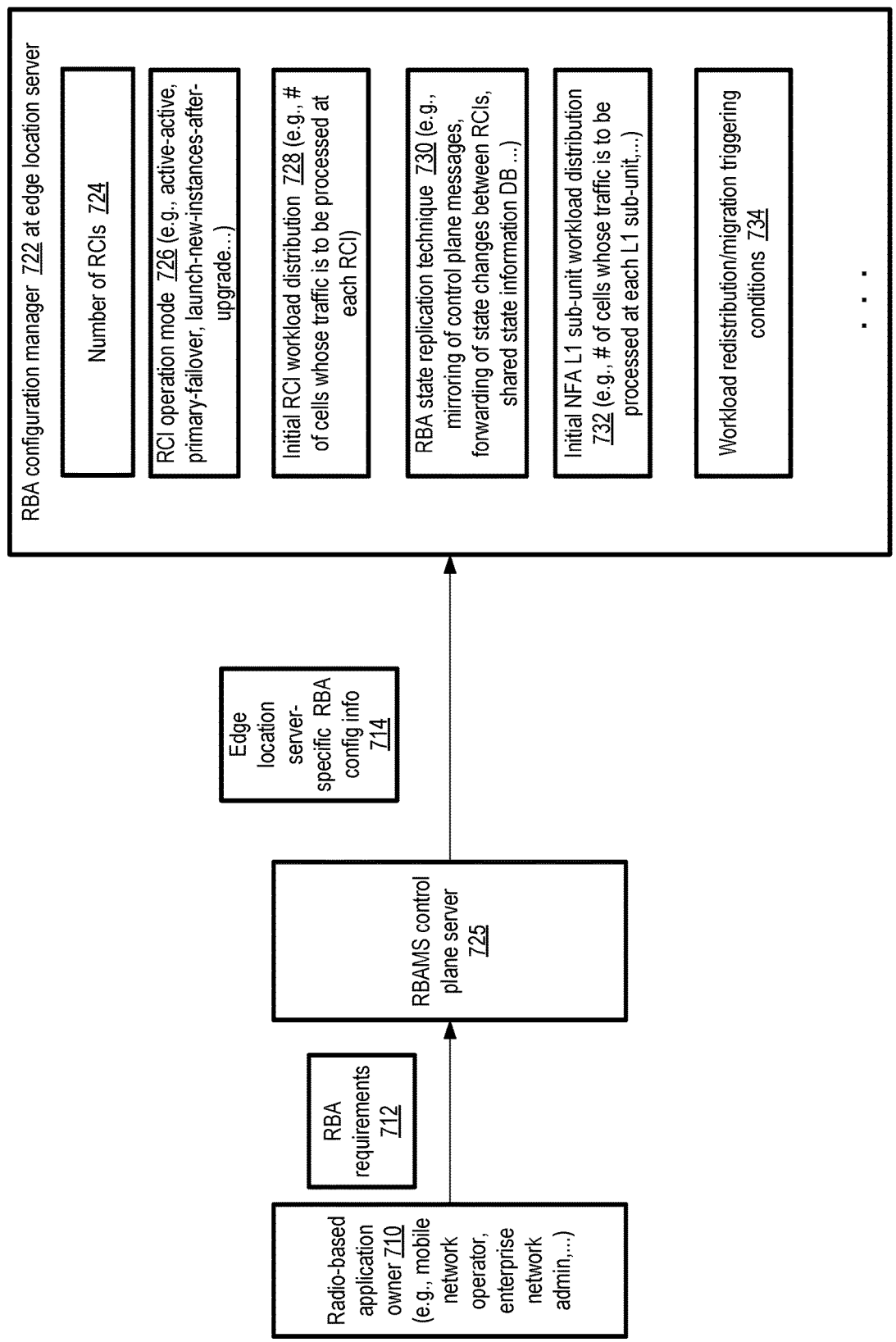
FIG. 7 illustrates example elements of radio-based application configuration information which may be employed to distribute workload at a virtualization server, according to at least some embodiments.

FIG. 7 illustrates example elements of radio-based application configuration information which may be employed to distribute workload at a virtualization server, according to at least some embodiments. A radio-based application owner 710, such as a mobile network operator or an administrator of an enterprise network which comprises devices that use radio-based signals for communication, may transmit an indication of the requirements 712 of a particular radio-based application to an RBAMS control plane server 725 in the depicted embodiment. The requirements may for example indicate the geographical areas within which end users are expected to use the RBA, the rates at which user-plane messages are anticipated in the different areas, latency requirements for the RBA, and so on. In response, the RBAMS control plane may identify premises (e.g., edge locations) at which virtualization servers equipped with NFAs should be deployed in order to handle the workload of the RBA, and in at least some embodiments obtain an approval of the proposed deployment from the RBA owner.

After the deployment architecture is approved, the RBMAS control plane server may transmit edge-location server-specific RBA configuration information 714 to a respective RBA configuration manager (RCM) 722 of a virtualization server at individual ones of the edge locations selected for implementing the RBA. The configuration information obtained by the RCM may be stored locally by the RCM and used in various embodiments for distributing and/or migrating workload between RCIs at the virtualization server.

The RBA configuration information 714 may include at least an initial number of RCIs 724 to be used for the RBA at the server, and the RCI operation mode 726 in the depicted embodiment. In some embodiments, several RCIs may be configured in active-active mode, in which each RCI is assigned a respective portion of the RBA's L2 workload at the time that the RCI is launched. As a result, in the active-active mode, in a given time interval, each RCI may process a respective set of user-plane messages at the L2 layer, with none of the RCIs typically remaining idle for long. If and when the RCM determines that workload is to be migrated from one RCI to another, the RCI selected as the destination of the migration may handle the workload of the source RCI (the one whose workload is being migrated) as well as the workload initially assigned to the destination RCI. In at least one embodiment, a primary-failover operation mode may be used, in which while some RCIs process user-plane L2 messages during normal modes of operations, other RCIs remain passive/idle (while still being provided access to RBA state information). In the primary-failover mode, a passive RCI can quickly take over the workload which was being handled by an active RCI earlier, in response to a control signal (or a change to a mapping between workload portions and RCIs) issued by the RCM.

In one embodiment, an RCI operation mode referred to as launch-new-instances-after-upgrade may be employed. In this approach, initially, a first RCI of a VS may initially run a first version of one or more programs (such as L2 implementation programs) used for executing network functions of a first portion of the workload of the RBA. A virtualized representation of an NFA may be presented to the first RCI, and used for interactions between the first RCI and the NFA hardware. When an upgrade to the software of the first RCI (e.g., an upgraded version of the L2 implementation programs) becomes available, the RCM may be informed (indicating that a transfer/migration of the workload of the first RCI is needed), and a new RCI comprising the upgraded programs may be launched at the VS. The state information of the RBA, which was being used by the first RCI for processing its assigned portion of the workload, may be made accessible to the new RCI, and a virtualized representation of the NFA may also be made accessible to the new RCI. The RCM may then transfer the workload portion which was assigned to the first RCI to the new RCI, and the new RCI may start receiving messages (via its virtualized NFA) and processing the messages (using the state information).

An indication of the initial RCI workload distribution 728 may be included in the configuration information in the depicted embodiment. For example, the number of cells whose user-plane traffic is to be handled by individual ones of the RCIs initially may be indicated in the workload distribution information. In some embodiments, the control plane server may transmit an indication of the RBA state replication technique 730 to be used to ensure that multiple RCIs have access to sufficient state information to enable any of the RCIs to take on the workload of any of the other RCIs. Example state replication techniques may include mirroring of RBA control plane messages, forwarding/relaying state change information from one RCI to another, storing the state information at a shared local data store or memory location, and so on.

In some embodiments in which an NFA of the virtualization server comprises a plurality of L1 sub-units of the kind discussed earlier (e.g., multiple processing cores capable of processing L1 network functions in parallel), the initial NFA L1 sub-unit workload distribution 732 may be indicated in the configuration information provided to the RCM. For example, the number of cells whose L1 traffic is to be processed at each of the L1 sub-units may be indicated. The RCM may maintain mappings between the RBA workload portions (e.g., one or more cells) and the L1 sub-unit responsible for that workload, and such mappings may be used to distribute received messages to the L1 sub-units in some embodiments.

In some embodiments, the configuration information may define workload redistribution/migration triggering conditions 734, informing the RCM about the techniques to use to determine if/when workload is to be migrated (e.g., from one RCI to another, or from one L1 sub-unit to another). In some cases, for example, the RCM may determine that workload is to be migrated from a particular RCI to another in response to receiving a message from the control plane indicating a scheduled maintenance event at the particular RCI. In other cases, the RCI may receive monitoring data indicating the number of errors at each RCI, and choose to migrate the workload from one RCI to another if the number of errors exceeds a threshold during a particular time interval. A detection of a crash or unplanned exit from an RCI may represent another triggering condition in the depicted embodiment. Additional RBA information, not shown in FIG. 7, may be used in some embodiments at the virtualization server for workload distribution and migration. In one embodiment, one or more of the configuration information elements shown in FIG. 7 may not be provided to or used by the RCM.

Figure 8:
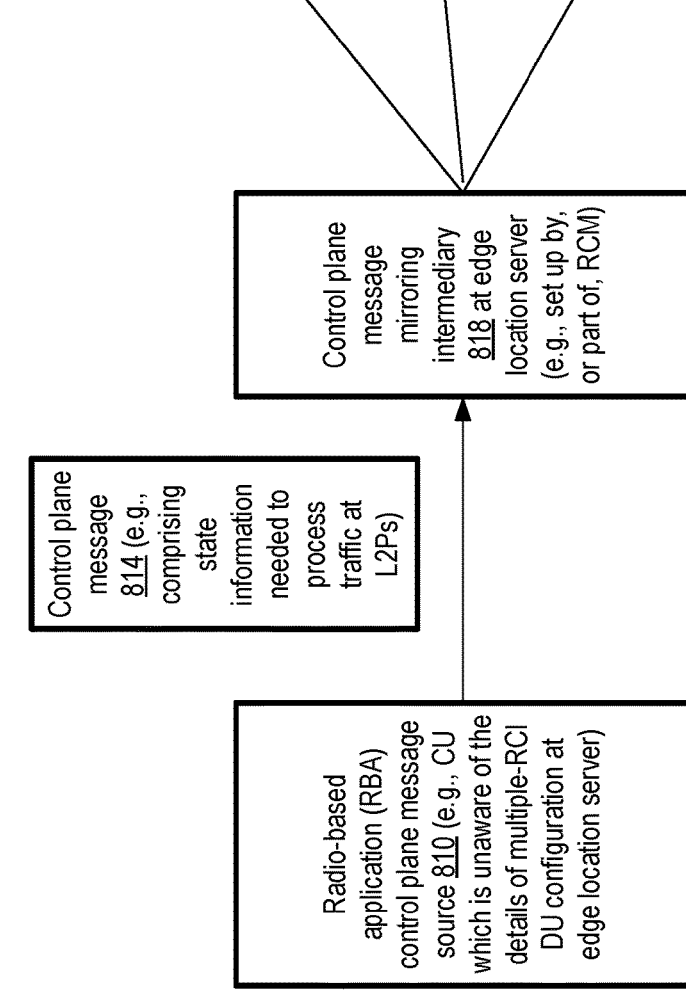
FIG. 8 illustrates an example control plane message mirroring technique which may be used to enhance availability of DUs at a virtualization server, according to at least some embodiments.

Configurations in which multiple RCIs collectively implement DU network functions of an RBA at a virtualization server may be referred to as multiple-RCI DU configurations herein. FIG. 8 illustrates an example control plane message mirroring technique which may be used to enhance availability of DUs at a virtualization server, according to at least some embodiments. An RBA control plane message source 810 may send a control plane message 814 to a virtualization server. The source 810 may, for example, be a CU which is unaware of the details of a multiple-RCI DU configuration (that is, the CU may not be aware that several different RCIs are being used collectively to implement DU network functions of the RBA at the virtualization server). The control plane message may include state information of various in-progress transmissions or communications of the RBA, such as transmissions between user equipment devices or transmissions between a user equipment device and a server; such state information may be needed to process the traffic of the RBA at L2 implementation programs at the RCIs set up at the virtualization server in various embodiments.

A control plane message mirroring intermediary 818 (also referred to as a state information distribution manager) may be established by, or be implemented as part of, an RCM at the edge location virtualization server in the depicted embodiment. The mirroring intermediary may cause replicas of the control plane message to be sent to each of several RCIs running at the virtualization server, such as RCI 824A, RCI 824B and RCI 824C in the depicted embodiment. As a result, each RCI may store a respective replica 828 (e.g., 828A, 828B or 828C) of RBA state information, which can be used to process L2 user-plane messages at that RCI for any portion (e.g., any cell) of the workload of the RBA.

Figure 9:
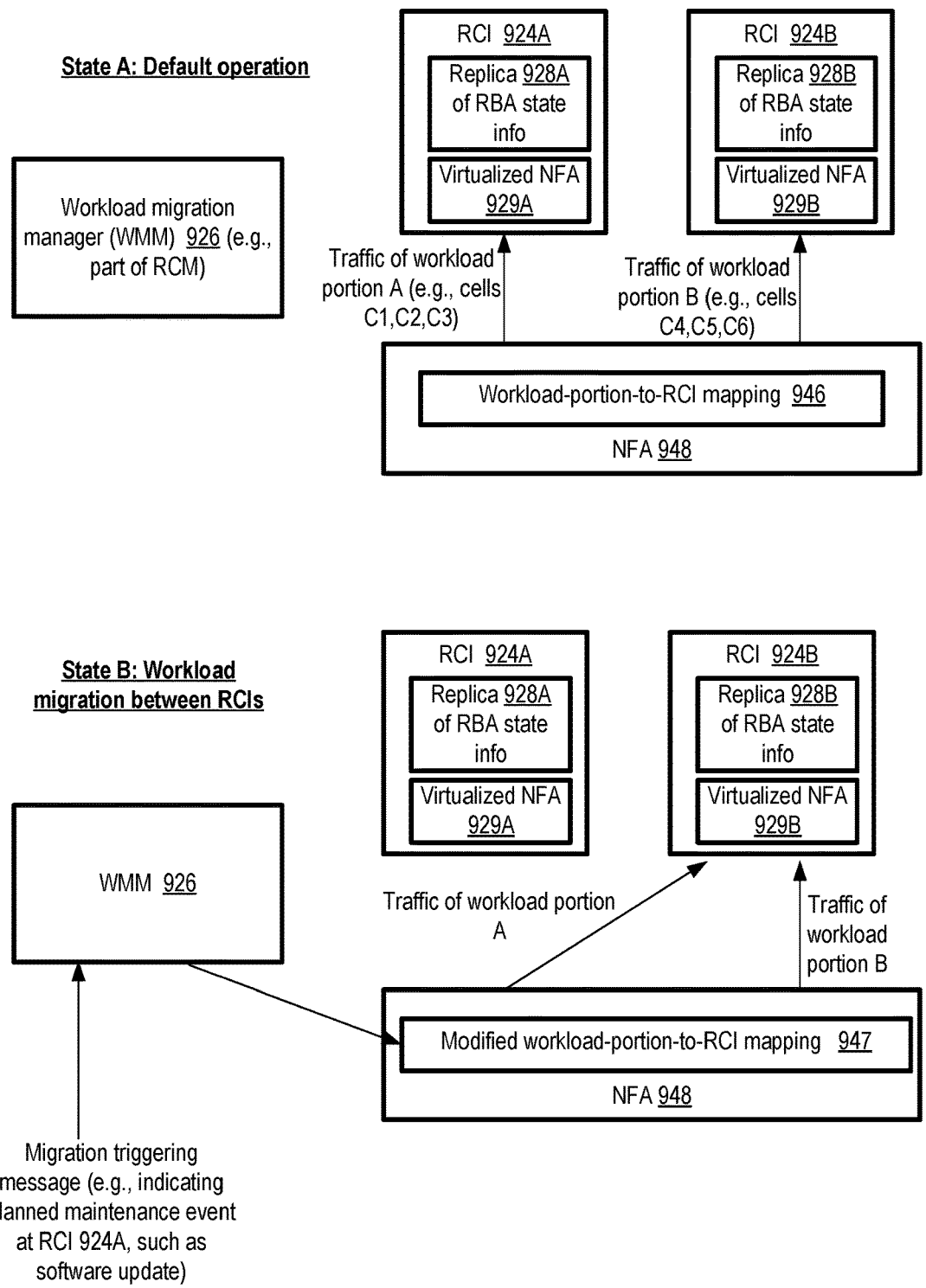
FIG. 9 illustrates an example of migration of a portion of a radio-based application's workload from one compute instance to another, according to at least some embodiments.

FIG. 9 illustrates an example of migration of a portion of a radio-based application's workload from one compute instance to another, according to at least some embodiments. State A shows a default or normal mode of operation of a pair of active-active RCIs at a virtualization server in the depicted embodiment. RCI 924A has access to replica 928A of RBA state information and a virtualized representation 929A of an NFA 948 of the virtualization server, while RCI 924B has access to replica 928B of RBA state information and a virtualized representation 929B of the NFA. The virtualization server comprises a workload migration manager (WMM) 926, which may be implemented as part of an RCM of the kind introduced earlier. A workload-portion to RCI mapping 946 enables the NFA 948 to direct RBA messages/packets to the appropriate RCI for L2 processing in the depicted embodiment.

In the default operation mode, traffic of workload portion A (e.g., traffic associated with a set of cells C1, C2, and C3) may be directed from the NFA to RCI 924A using the mapping 946, while traffic of a different workload portion B (e.g., traffic associated with cells C4, C5 and C6) may be directed from the NFA to RCI 924B. The mapping 946 may have been established by the RCM based on RBA configuration information received from a control plane server of an RBAMS in the depicted embodiment.

State B represents workload migration between RCIs in FIG. 9. The WMM may receive a migration triggering message, for example indicating a planned maintenance event at RCI 924A such as a software update/upgrade. The WMM may change the mapping, resulting in modified workload-portion-to-RCI mapping 947. Based on the modified mapping, traffic of both workload portion A and portion B may be sent to RCI 924B for L2 processing in the depicted embodiment. Because RCI 924B has access to the same RBA state information that was being used by RCI 924A, RCI 924B may immediately start processing user-plane messages for workload portion A. In some cases, the traffic of portion A may be switched back to RCI 924A after some time by again modifying the mapping, e.g., after the software of RCI 924A has been updated or the condition that caused the migration no longer holds.

FIG. 9 shows the migration of L2 processing from one RCI to another. A similar approach may be used for traffic from the L2 layer to the L1 layer in embodiments in which the NFA comprises discrete L1 sub-units which can process respective portions of L1 traffic in parallel. A mapping between workload portions and L1 sub-units may be maintained and modified as needed to enable L1 traffic to be migrated between the sub-units. In addition, traffic from the L3 or CU layer may also be distributed and redistributed among RCIs in some embodiments using workload-portion-to-RCI mappings in various embodiments. For example, an intermediary set up for user-plane messages received from a CU at the virtualization server may use the mapping to direct the messages to the appropriate RCI.

Figure 10:
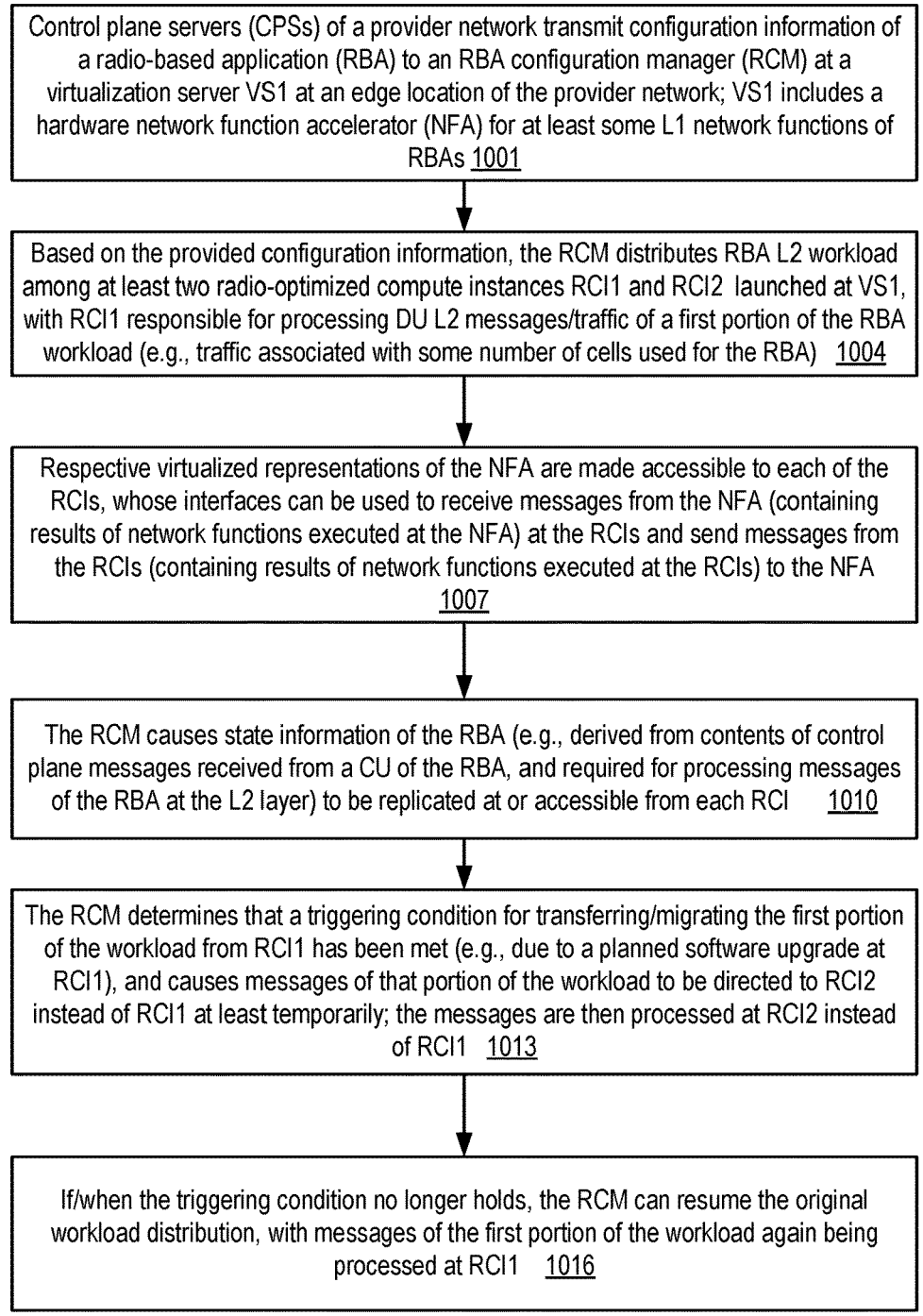
FIG. 10 is a flow diagram illustrating aspects of operations that may be performed to manage availability of distributed units of radio-based applications, according to at least some embodiments.

FIG. 10 is a flow diagram illustrating aspects of operations that may be performed to manage availability of distributed units of radio-based applications, according to at least some embodiments. As shown in element 1001, one or more control plane servers of a service of a provider network may transmit configuration information/requirements of an RBA to an RCM of a virtualization server VS1 at an edge location of the provider network. VS1 may include a hardware NFA configured to execute at least some L1 network functions of RB As.

Based on the provided configuration information, an RBA's L2 workload (i.e., processing of user-plane messages at the L2 layer for the RBA) may be distributed among at least two RCIs RCI1 and RCI2 in the depicted embodiment (element 1004). In some embodiments, the RCM may cause RCI1 and RCI2 to be launched, e.g., by sending requests to virtualization management components of VS1. In one implementation, one or more mappings between workload portions (e.g., some number of cells) and the RCIs responsible for processing L2 messages/traffic for those portions may be stored or maintained by the RCM. Based on an initial version of the mapping, RCI1 may be assigned to process user-plane messages of one or more cells used for the RBA in the depicted embodiment, and RCI2 may be assigned to process user plane messages of a different set of cells. In some implementations, one or more RCIs may be set up in passive mode initially, without assigning a subset of the workload to them; such passive RCIs may be activated to start processing some of the workload if/when triggering conditions for migrating workload from active RCIs are met.

Respective virtualized representations of the NFA may be made accessible to each of the RCIs in the depicted embodiment (element 1007), e.g., by the virtualization management components at the request of the RCM. Programmatic interfaces (e.g., virtual functions) of the virtualized representations may be used to receive messages from the NFA (comprising results of L1 network functions executed at the NFA) at the RCIs, and to send messages from the RCIs to the NFA (comprising results of network functions implemented, e.g., at the L2 layer, at the RCIs).

The RCM may cause state information of the RBA (e.g., derived from or based on contents of control plane messages from a CU or an RU, and required for processing messages of the RBA at the L2 layer) to be replicated at, or accessible from, each of the RCIs in various embodiments (element 1010). For example, the RCM may comprise a message replicator that causes respective copies of RBA control plane messages to be sent to each RCI in one implementation.

The RCM may determine that a triggering condition for transferring/migrating the first portion from RCI1 to some other RCI has been met (element 1013), e.g., due to a planned software upgrade or other reasons such as errors/failures. The RCM may then cause user plane messages of that portion of the workload to be directed to RCI2 instead of or in addition to RCI1 at least temporarily, e.g., by modifying a mapping of the kind discussed above. The transferred/migrated messages may then be processed at RCI2 using the state information of the RBA. If/when the triggering condition no longer holds (e.g., after the software of RCI1 has been updated, or after RCI1 recovers from a crash or failure), the RCM may resume the original workload distribution, with messages of the first portion of the workload once again being processed at RCI1 (element 1016). It is noted that in various embodiments, some of the operations shown in the flow diagram of FIG. 10 may be implemented in a different order than that shown in the figure, or may be performed in parallel rather than sequentially. Additionally, some of the operations shown in FIG. 10 may not be required in one or more implementations.

Figure 11:
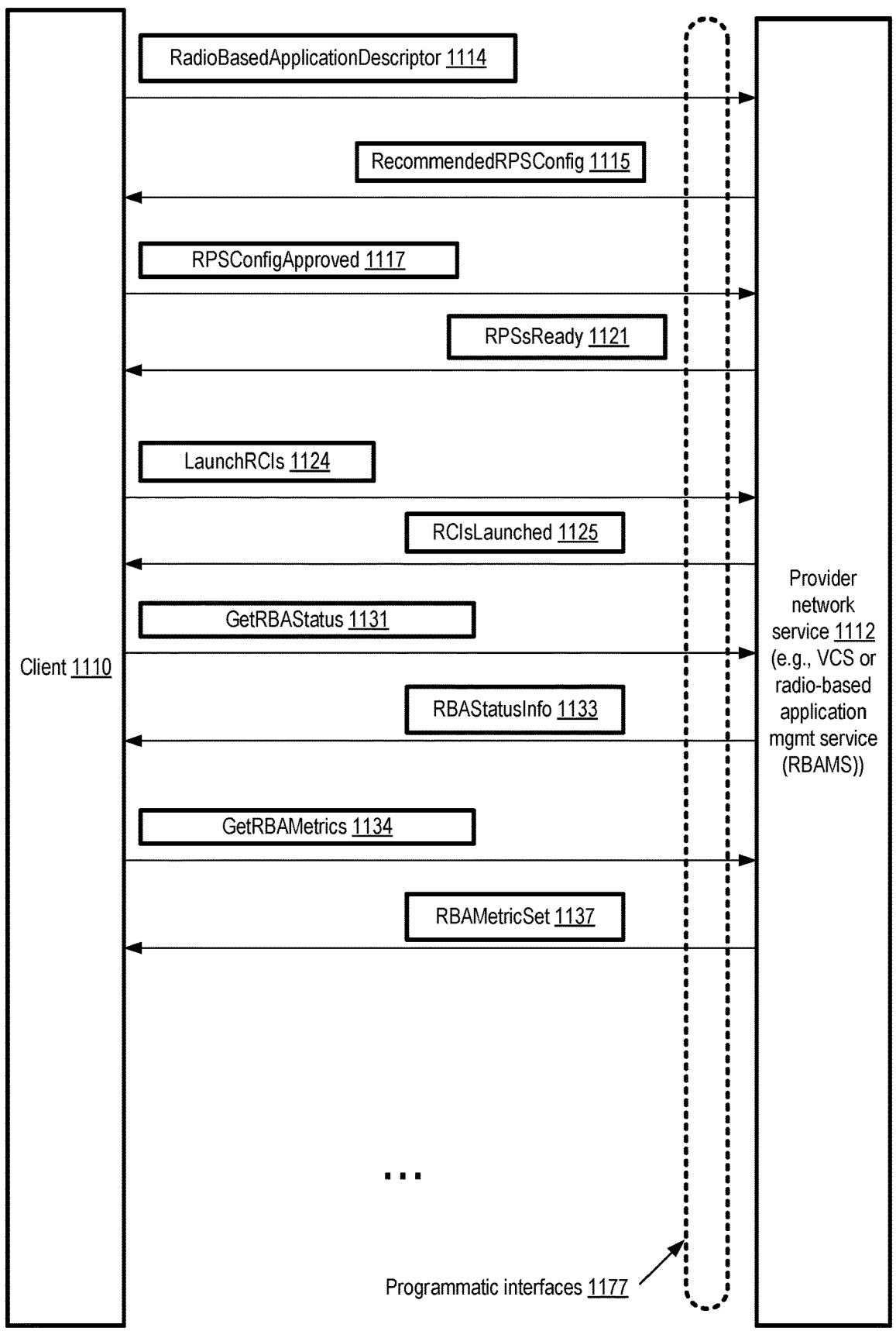
FIG. 11 illustrates example programmatic interactions, pertaining to radio-based applications, between clients and a provider network service, according to at least some embodiments.

FIG. 11 illustrates example programmatic interactions, pertaining to radio-based applications, between clients and a provider network service, according to at least some embodiments. In the depicted embodiment, a provider network service 1112 (such as a VCS or an RBAMS) may implement a set of programmatic interfaces 1177, such as web-based consoles, command-line tools, graphical user interfaces, APIs and the like, which can be utilized by service clients to submit messages or requests to the service and receive corresponding responses.

A client 1110 (e.g., an administrator or owner of an RBA) may use programmatic interfaces 1177 to send a RadioBasedApplicationDescriptor message 1114 to the service 1112, indicating a set of locations of cells near which RPSs may be required, for a given RBA, the workloads expected at the locations (e.g., how many end user devices for the client's radio-based applications such as public 5G networks or private 5G networks are expected to be utilized at each location, what the approximate expected message rates from the end users are at various times of the day or days of the week, etc.), the quality of service (e.g., message latencies for different kinds of traffic) desired for the RBA, and the like. The information provided by the client may be analyzed at the provider network, e.g., by a control plane server, and a recommendation of an RPS configuration that can be used to satisfy the estimated requirements of the client's application may be prepared. The recommendation, which may for example indicate the count and types of RPSs proposed for each of one or more specific edge locations (point-of-presence sites, client-owned premises, cell towers etc.), may be provided to the client in one or more RecommendedRPSConfig messages 1115 in the depicted embodiment.

If the client approves the recommendations, an RPSConfigApproved message 1117 may be sent via interfaces 1177 to the service 1112. If new RPSs have to be transported to and installed at the approved recommended sites, the process for doing so may be initiated by the provider network operator (note that this process may take some time, e.g., several days in some cases). In some cases, additional RPSs may be added to a pre-installed set of RPSs (used for other clients, or currently unused but set up in anticipation of client requirements) at one or more of the recommended sites to accommodate the additional workload indicated by the client. When the RPSs that are to be used for the client have been identified, and after connectivity between the RPSs and the control plane resources of the provider network has been verified, an RPSsReady message 1121 may be sent to the client in some embodiments to indicate that the client can request the launch of compute instances for their radio-based applications. In some embodiments, respective identifiers of the RPSs designated for the client's use may be provided in an RPSsReady message, and such identifiers can be used by the client to request launches of radio-optimized compute instances at individual RPSs. In some embodiments, before the client's radio-optimized compute instances are launched, the service 1112 may also verify that connectivity has also been established between the RPSs designated for the client's use and (a) the RUs (radio units) at the cells which are to be used for the client's applications as well as (b) the resources to be used for centralized units (CUs) and/or other layers of the applications' stacks. In other embodiments, such verification of connectivity to RUs and/or CUs may be performed after the compute instances are launched.

A client 1110 may submit one or more LaunchRCIs requests 1124 via the programmatic interfaces 1177 in various embodiments, indicating for example the sites/premises, ERGs, or the specific RPSs at which one or more RCIs are to be instantiated for the client's applications. An RCIsLaunched message 1125 may be sent to the client 1110 in some embodiments, confirming that the RCIs have been launched. In some embodiments, configuration information about the launched RCIs may be provided to the client, such as instance identifiers, IP addresses etc. (which can be used to communicate with CUs, RUs and/or core network resources of the client's applications). In one embodiment, the control plane servers of the provider network service may automatically launch one or more compute instances at an RPS based on information provided by the client about the desired configuration of the RBA, and a LaunchRCIs request from the client may not be required. In some embodiments, a client may indicate the initial distribution of workload among the RCIs, e.g., a respective portion of the overall DU/L2 workload which is to be handled initially by each RCI may be specified in a LaunchRCIs request.

In at least one embodiment, a client may submit a GetRBAStatus request 1131 to the service, requesting the current status of RCIs at various edge locations being used for the RBA. An indication of the launched RCIs at the edge locations, in some cases including the cell-to-RCI mappings, may be provided to the client in one or more RBAStatusInfo messages 1133.

A client may submit a GetRBAMetrics request 1134 to the service in some embodiments, requesting metrics collected at one or more RPSs being used for the client's RBA. The requested set of metrics may be provided to the client via one or more RBAMetricSet messages 1137 in the depicted embodiment. For example, a client may obtain traffic metrics indicating how many messages were transmitted to and from RUs and/or CUs during a time interval, the total amount of data transferred to and from RUs/CUs, the latencies for such messages, whether any messages were lost, the number of workload migrations among RCIs and the reasons for the migrations, and so on. Other types of programmatic interactions pertaining to implementation of radio-based applications using provider network resources may be supported in some embodiments than those shown in FIG. 11.

Figure 12:
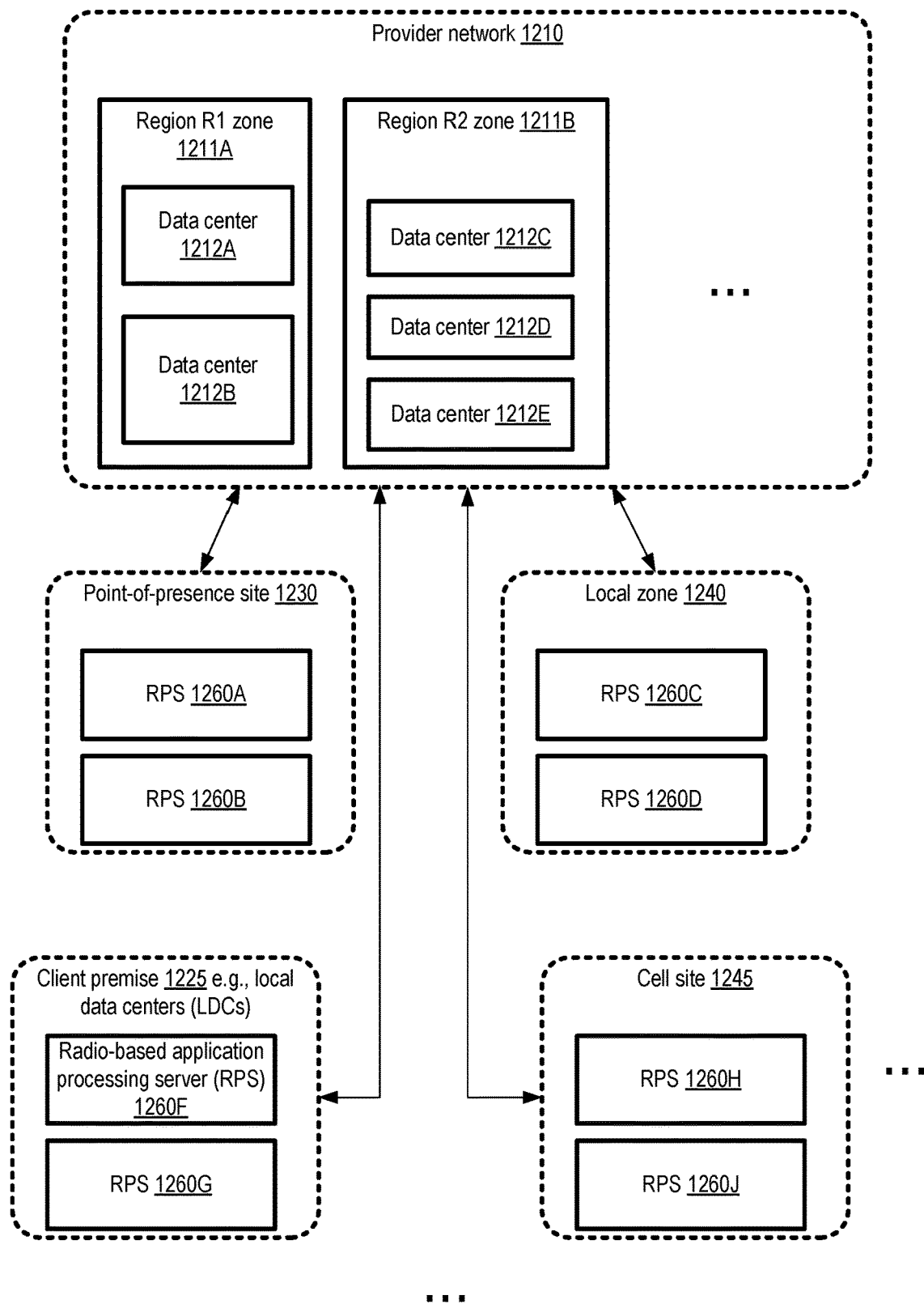
FIG. 12 illustrates example premises and sites at which radio-based application processing servers may be deployed, according to at least some embodiments.

FIG. 12 illustrates example premises and sites at which radio-based application processing servers may be deployed, according to at least some embodiments. In the embodiment depicted in FIG. 12, resources of a provider network 1210 may be organized into regional zones, such as region R1 zone 1211A and region R2 zone 1211B. A given regional zone may in turn comprise one or more data centers located relatively close to each other (e.g., within the same state or metropolitan area). Region R1 zone 1211A comprises data centers 1212A and 1212B, while region R2 zone 1211B comprises data centers 1212C, 1212D and 1212E in the example shown in FIG. 12. Each such data center 1212 may comprise control plane servers and data plane resources and artifacts of one or more services such as a virtualized computing service (VCS) similar to VCS 110 of FIG. 1 and/or a radio-based application management service (RBAMS).

RPSs (e.g., virtualization servers equipped with NFAs) of the kind described above may be configured, in response to programmatic requests from clients, at a variety of facilities other than the provider network's own data centers 1212 in the depicted embodiment. Such facilities may include, among others, cell sites 1245, client premises 1225 such as local data centers, local zones 1240, and/or point-of-presence sites 1230 in different embodiments. As shown, RPSs 1260A and 1260B may be set up, e.g., within a single rack, at point-of-presence site 1230. RPSs 1260C and 1260D may be set up at local zone 1240, RPSs 1260F and 1260G may be set up at a client-owned premise 1225, and RPSs 1260H and 1260J may be set up at a cell site (e.g., a room or group of rooms located next to cell towers with antennas). Other types of facilities and locations may be used for RPSs in some embodiments, instead or in addition to those shown in FIG. 12. From each RPS at a given facility, connectivity may be established with the control plane servers of the provider network in various embodiments, and with radio units (RUs) typically located very near or in the facilities. After such connectivity has been verified, in various embodiments software components such as RCIs with L2Ps may be launched at the RPS to process radio-based application workloads as described earlier.

Figure 13:
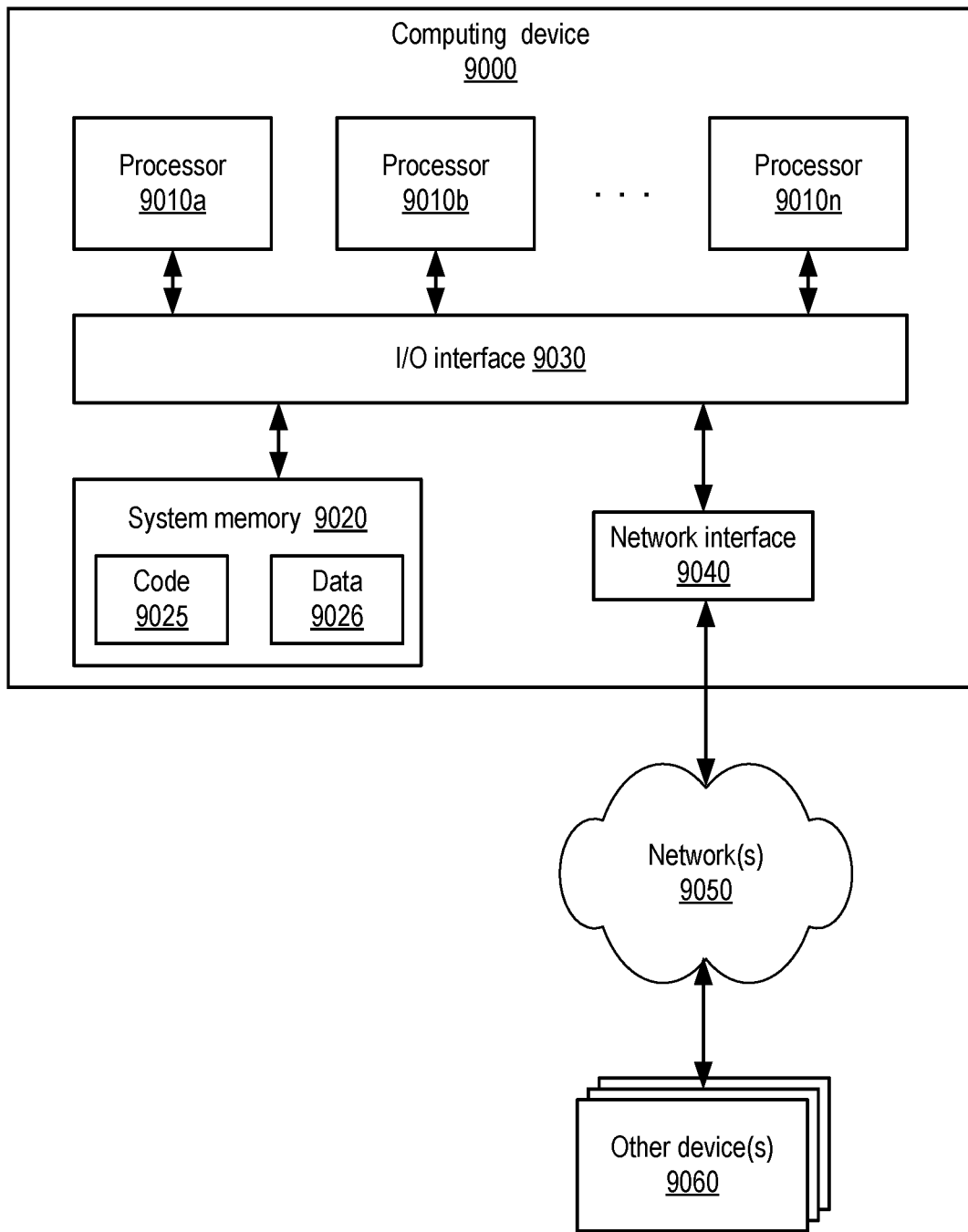
FIG. 13 is a block diagram illustrating an example computing device that may be used in at least some embodiments.

In at least some embodiments, a server that implements the types of techniques described herein (e.g., various functions of a provider network service such as a VCS or RBAMS, including functions within the provider network service as well as at edge locations or other premises used for implementing RBAs), may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 12. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a control plane server of a cloud provider network; and
   a virtualization server located at an edge location of the cloud provider network, wherein the virtualization server includes (a) a network function accelerator for radio-based applications and (b) a radio-based application configuration manager;
   wherein the radio-based application configuration manager is configured to:
      in response to receiving configuration information of a radio-based application from the control plane server, assign a first compute instance of a plurality of compute instances launched at the virtualization server to process user plane messages of a first portion of a workload of the radio-based application, wherein a respective virtualized representation of the network function accelerator is accessible to the first compute instance and a second compute instance of the plurality of compute instances, wherein a first user plane message of the first portion of the workload is (a) received at the first compute instance via an interface of a first virtualized representation of the network function accelerator and (b) comprises a result of a network function executed at the network function accelerator;
      cause state information of the radio-based application to be replicated at the first compute instance and the second compute instance, wherein the state information is used at the first compute instance to process user plane messages of the first portion of the workload; and
      in response to a determination that a triggering condition for transferring the first portion of the workload from the first compute instance has been met, cause at least a second user plane message of the first portion of the workload to be directed to the second compute instance instead of the first compute instance, wherein the second user plane message comprises a result of another network function executed at the network function accelerator, wherein the second compute instance obtains the second user plane message via an interface of a second virtualized representation of the network function accelerator, and wherein the second compute instance utilizes the state information to process the second user plane message.

2. The system as recited in claim 1, wherein the first compute instance comprises a program implementing at least a portion of a distributed unit (DU) of the radio-based application to process user plane messages of the radio-based application, and wherein the second compute instance comprises another program implementing at least a portion of the DU.

3. The system as recited in claim 1, wherein to make the determination that the triggering condition has been met, the radio-based application configuration manager is further configured to:
   determine that a maintenance event has been scheduled at the first compute instance.

4. The system as recited in claim 1, wherein to make the determination that the triggering condition has been met, the radio-based application configuration manager is further configured to:
   determine that an error has occurred at the first compute instance.

5. The system as recited in claim 1, wherein to cause the state information to be replicated, the radio-based application configuration manager is further configured to:
   cause (a) a first replica of a control plane message of the radio-based application to be received at the first compute instance, and (b) a second replica of the control plane message to be received at the second compute instance.

6. A computer-implemented method, comprising:
   presenting a first virtualized representation of a network function accelerator of a virtualization server to a first compute instance launched at the virtualization server, wherein the first compute instance is configured to process user plane messages of a first portion of a workload of a radio-based application which comprises network functions executed at the network function accelerator, and wherein a first user plane message of the first portion of the workload is received at the first compute instance via an interface of the first virtualized representation;
   presenting a second virtualized representation of the network function accelerator to a second compute instance launched at the virtualization server;
   replicating state information of the radio-based application at the first compute instance and the second compute instance, wherein the state information is utilized at the first compute instance to process user plane messages of the first portion of workload;
   in response to determining that a condition for migrating the first portion of the workload has been met, causing a second user plane message of the first portion of the workload to be directed to the second compute instance instead of the first compute instance; and
   utilizing, by the second compute instance, the replicated state information to process the second user plane message, wherein the second user plane message is received at the second compute instance via an interface of the second virtualized representation.

7. The computer-implemented method as recited in claim 6, wherein the first compute instance comprises a layer 2 (L2) network function implementation program of a radio-based technology stack, wherein the layer 2 network function implementation program processes the user plane messages of the first portion of the workload, and wherein the network function accelerator executes a layer 1 (L1) network function of the radio-based technology stack.

8. The computer-implemented method as recited in claim 6, wherein determining that the condition for migrating the first portion of the workload has been met comprises determining that a maintenance event is scheduled at the first compute instance.

9. The computer-implemented method as recited in claim 6, wherein determining that the condition for migrating the first portion of the workload has been met comprises determining that an error or failure has occurred at the first compute instance.

10. The computer-implemented method as recited in claim 6, wherein replicating the state information comprises:
receiving a control plane message of the radio-based application at a state information distribution manager of the virtualization server, wherein the control plane message comprises a portion of the state information; and
transmitting, by the state information distribution manager, (a) a first replica of the control plane message to the first compute instance, and (b) a second replica of the control plane message to the second compute instance.

11. The computer-implemented method as recited in claim 6, wherein replicating the state information comprises:
updating a version of the state information by the first compute instance in response to receiving a control plane message of the radio-based application; and
transmitting a message indicating an update of the version from the first compute instance to the second compute instance.

12. The computer-implemented method as recited in claim 6, further comprising:
processing, by the second compute instance, user plane messages of a second portion of the workload of the radio-based application prior to a determination that the condition for migrating the first portion of the workload has been met.

13. The computer-implemented method as recited in claim 6, wherein the network function accelerator comprises a chip set at a card connected to a primary processor of the virtualization server via a peripheral interconnect.

14. The computer-implemented method as recited in claim 6, further comprising:
receiving an indication of a set of cells utilized by the radio-based application; and
assigning the first portion of the workload to the first compute instance, wherein the assigning comprises identifying one or more cells of the set of cells whose user plane messages are to be processed at the first compute instance, and one or more cells of the set of cells whose user plane messages are not to be processed at the first compute instance.

15. The computer-implemented method as recited in claim 6, wherein the virtualization server is located at an edge location of a cloud provider network.

16. A non-transitory computer-accessible storage medium storing program instructions that when executed on one or more processors:
cause state information of a radio-based application to be accessible from a first compute instance launched at a virtualization server, wherein the state information is utilized to process at least some messages of the radio-based application, wherein the first compute instance is assigned to process a first portion of a workload of the radio-based application, and wherein the first compute instance includes a first version of one or more programs utilized to process messages of the radio-based application;
cause a first virtualized representation of a network function accelerator of the virtualization server to be made accessible from a first compute instance, wherein a first message of the first portion of the workload comprises a result of execution of a network function at the network function accelerator of the virtualization server, and wherein the first message is received at the first compute instance via the first virtualized representation;
cause a second compute instance to be launched at the virtualization server, wherein the second compute instance comprises a second version of the one or more programs;
cause the state information of the radio-based application to be accessible from the second compute instance;
cause a second virtualized representation of the network function accelerator to be made accessible from the second compute instance;
in response to determining that a condition for migrating the first portion of the workload of the radio-based application has been met, cause a second message of the first portion of the workload to be directed to the second compute instance instead of the first compute instance, wherein the second message is received at the second compute instance via the second virtualized representation; and
cause the second compute instance to process the second message using the state information.

17. The non-transitory computer-accessible storage medium as recited in claim 16, wherein the first compute instance comprises a layer 2 (L2) network function implementation program of a radio-based technology stack, wherein the layer 2 network function implementation program processes messages of the first portion of the workload, and wherein the network function accelerator executes layer 1 (L1) network functions of the radio-based technology stack.

18. The non-transitory computer-accessible storage medium as recited in claim 16, wherein determining that the condition for migrating the first portion of the workload has been met comprises determining that a maintenance event is scheduled at the first compute instance.

19. The non-transitory computer-accessible storage medium as recited in claim 16, wherein determining that the condition for migrating the first portion of the workload has been met comprises determining that an error or failure has occurred at the first compute instance.

20. The non-transitory computer-accessible storage medium as recited in claim 16, wherein the second version is a different version of the one or more programs deployed to virtualization server.

* * * * *